United States Patent
Yoshimura et al.

(10) Patent No.: US 10,256,885 B2
(45) Date of Patent: Apr. 9, 2019

(54) TERMINAL DEVICE, FEEDBACK INFORMATION GENERATION METHOD, AND BASE STATION DEVICE

(71) Applicant: Sharp Kabushiki Kaisha, Sakai, Osaka (JP)

(72) Inventors: Tomoki Yoshimura, Sakai (JP); Hiromichi Tomeba, Sakai (JP); Ryota Yamada, Sakai (JP); Katsuya Kato, Sakai (JP); Kozue Yokomakura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 89 days.

(21) Appl. No.: 15/315,150

(22) PCT Filed: May 21, 2015

(86) PCT No.: PCT/JP2015/064661
§ 371 (c)(1),
(2) Date: Nov. 30, 2016

(87) PCT Pub. No.: WO2015/186531
PCT Pub. Date: Dec. 10, 2015

(65) Prior Publication Data
US 2017/0195030 A1 Jul. 6, 2017

(30) Foreign Application Priority Data
Jun. 2, 2014 (JP) .................................. 2014-114396

(51) Int. Cl.
*H04B 7/06* (2006.01)
*H04B 7/04* (2017.01)
(Continued)

(52) U.S. Cl.
CPC ............. *H04B 7/0626* (2013.01); *H04B 7/04* (2013.01); *H04B 7/0417* (2013.01);
(Continued)

(58) Field of Classification Search
CPC .. H04B 7/0626; H04B 7/0628; H04B 7/0632; H04L 25/0204
See application file for complete search history.

(56) References Cited

U.S. PATENT DOCUMENTS

2009/0061786 A1 3/2009 Malik et al.
2011/0164700 A1* 7/2011 Porat .................... H04B 7/0417
375/267

FOREIGN PATENT DOCUMENTS

JP 2005-323217 A 11/2005
JP 2005323217 * 11/2005 .............. H04J 15/00
(Continued)

OTHER PUBLICATIONS

Official Communication issued in International Patent Application No. PCT/JP2015/064661, dated Aug. 4, 2015.
(Continued)

*Primary Examiner* — Mohammad S Anwar
(74) *Attorney, Agent, or Firm* — Keating & Bennett, LLP

(57) ABSTRACT

A channel estimation unit estimates channel state information to or from a base station device. A feedback information generation unit performs a decomposition process for the channel state information and thereby acquires first decomposition information that includes plural singular values and second decomposition information that includes plural right singular vectors respectively associated with the plural singular values. The feedback information generation unit mutually replaces portions of the plural singular values, thereby acquires first replacement information, and further acquires second replacement information based on the first
(Continued)

replacement information and the plural right singular vectors. The feedback information generation unit performs a conversion process for the second replacement information and thereby acquires second conversion information. A radio transmission unit notifies the base station device of the second conversion information.

9 Claims, 14 Drawing Sheets

(51) Int. Cl.
  *H04J 11/00* (2006.01)
  *H04L 25/02* (2006.01)
  *H04B 7/0417* (2017.01)
  *H04B 7/0452* (2017.01)
  *H04B 7/0426* (2017.01)

(52) U.S. Cl.
  CPC ......... *H04B 7/0434* (2013.01); *H04B 7/0452* (2013.01); *H04B 7/06* (2013.01); *H04B 7/063* (2013.01); *H04B 7/0628* (2013.01); *H04B 7/0632* (2013.01); *H04J 11/00* (2013.01); *H04L 25/0202* (2013.01); *H04L 25/0204* (2013.01); *H04L 25/0248* (2013.01); *H04L 25/0208* (2013.01)

(56) References Cited

FOREIGN PATENT DOCUMENTS

| JP | 2008-536342 A | | 9/2008 |
|---|---|---|---|
| JP | NPL132180 | * | 2/2013 |
| WO | 2012/170530 A1 | | 12/2012 |

OTHER PUBLICATIONS

Matsumoto et al., "Performance Evaluation of CSI Compression Scheme Using Multiuser MIMO Testbed", IEICE Technical Report, vol. 112, No. 443, RCS2012-292, Feb. 2013, pp. 49-54.

* cited by examiner k1
SUBCARRIER INDEX k1
SUBCARRIER INDEX

TERMINAL DEVICE, FEEDBACK INFORMATION GENERATION METHOD, AND BASE STATION DEVICE

TECHNICAL FIELD

The present invention relates to a terminal device, a feedback information generation method, and a base station device.

This application claims priority from Japanese Patent Application No. 2014-114396 filed in Japan on Jun. 2, 2014, the disclosure of which is incorporated herein by reference.

BACKGROUND ART

A multiple input multiple output (MIMO) technology that uses plural antennas for transmission and reception and transmits plural data streams in the same frequency band has been employed in cellular systems, wireless LAN systems, and so forth. Here, as the cellular system, Long Term Evolution (LTE), LTE-Advanced (LTE-A), and so forth, which are standardized in the Third Generation Partnership Project (3GPP), have been known. As the wireless LAN system, IEEE 802.11ac and so forth, which are standardized in the Institute of Electrical and ElectroNics Engineers, Inc. (IEEE) have been known.

Among MIMO technologies, the MIMO transmission in which one terminal device that has plural receive antennas communicates with a base station device that has plural transmit antennas is referred to as single user MIMO (SU-MIMO). In the SU-MIMO, the terminal device demultiplexes plural multiplexed streams by MIMO signal demultiplexing based on channel state information (CSI) with respect to radio signals which are transmitted from the base station device and in which plural data streams are spatially multiplexed.

In a case where the base station device perceives the CSI as known, the base station device forms a virtual orthogonal channel by performing precoding and thereby performs transmission. This transmission is referred to as eigenmode transmission. The eigenmode transmission is also referred to as singular value decomposition-multiple input multiple output (SVD-MIMO) or eigenbeam-spatial division multiplex (E-SDM). In the eigenmode transmission, the base station device performs singular value decomposition (SVD) or the precoding based on singular value decomposition for a transmission data sequence. The precoding in the eigenmode transmission enables the terminal device to easily demultiplex the multiplexed streams. Further, the base station device performs adaptive power allocation, adaptive modulation, or the like with respect to the virtual orthogonal channel and may thereby improve spectral efficiency.

Further, the MIMO transmission that performs communication while assuming plural terminal devices as virtual large-scale array antennas is referred to as multi-user MIMO (MU-MIMO). The MU-MIMO is effective for an improvement in the spectral efficiency and is employed in the LTE and so forth.

In the MU-MIMO, the base station device is simultaneously connected with plural terminal devices and performs communication. However, in the MU-MIMO, a signal addressed to a certain terminal device is received as an interference signal by the other terminal devices (multi-user interference). Accordingly, in the MU-MIMO, the base station device performs the precoding for the transmission data sequence and thereby suppresses the multi-user interference that is received by the terminal devices.

In the MU-MIMO, a closed-loop type MU-MIMO has been suggested. The closed-loop type MU-MIMO is MIMO transmission that uses the SVD or the precoding based on the singular value decomposition. In the closed-loop type MU-MIMO, similarly to the eigenmode transmission, each of the terminal devices feeds back information for forming the virtual orthogonal channel to the base station device. The base station device performs a linear or non-linear precoding process for the information that is fed back and thereby cancels the interference among the terminal devices.

In the SU-MIMO and the MU-MIMO, the base station device has to recognize the channel between the base station device and the terminal device in order to perform the precoding. However, in a case of a wireless communication system based on frequency division duplex (FDD) that uses different carrier frequencies for up and down links, the channels for the up and down links are different. In this case, the terminal device estimates channel state information and notifies (feeds back to) the base station device of the channel state information by using an uplink resource. Accordingly, the base station device may recognize the channel state information to the terminal device. Taking into account the change in time in the channel state information and a large increase in uplink overhead, the information of which the terminal device notifies the base station device (feedback information) is preferably compressed to an appropriate amount.

A compression method in a multi-carrier system by time-frequency transform has been suggested (NPL 1). In NPL 1, the terminal device performs inverse discrete Fourier transform (IDFT) for the channel state information that is expressed in a frequency domain and thereby acquires the channel state information that is expressed in a time domain. The terminal device only extracts components with high power of the channel state information that is expressed in the time domain.

Further, in a case of taking into account the eigenmode transmission and the closed-loop type MU-MIMO, the terminal device does not feed back estimated channel state information but may notify the base station device of the information of a right singular vector. The right singular vector may be obtained by performing the SVD, the singular value decomposition, or the like for the channel state information. In addition, PTL 1 discloses a method in which the terminal device performs phase rotation for the right singular vector and thereby compresses an information amount to be notified to the base station device. As described above, the terminal device may compress the feedback information itself by using properties of the right singular vector. Further, the terminal device adaptively changes the number of eigenvectors to feed back to the base station device in accordance with the number of transmission streams and may thereby adjust a feedback amount.

CITATION LIST

Patent Document

[PATENT DOCUMENT 1] PTL 1: Japanese Unexamined Patent Application Publication (Translation of PCT Application) No. 2008-536342

Non Patent Document

[NON PATENT DOCUMENT 1] NPL 1: Tomoko Matsumoto, Yasuyuki Hatakawa, Satoshi Konishi, "Performance Evaluation of CSI Compression Scheme Using Multiuser MIMO Testbed", Technical Report of IEICE, RCS 2012-292, pp. 49-54, March 2013

DISCLOSURE OF THE INVENTION

Problems to be Solved by the Invention

The method that is disclosed in NPL 1 and is based on the time-frequency transform uses a fact that properties of the channel itself, that is, time-domain responses of a frequency transfer function of the channel become a channel impulse function. However, the terminal device may feed back a channel-related information. Here, the channel-related information is information that is calculated based on the channel state information, for example, the right singular vector, the singular value, and so forth. In this case, there is a problem that the feedback information based on the time-frequency transform does not necessarily retain the properties of the channel itself and is thus not sufficiently compressed.

However, the techniques disclosed in PTL 1 and NPL 1 do not define which singular value of each subcarrier or information that corresponds to the singular value is combined or selected in a case where the feedback information in the MIMO transmission is generated. Thus, the techniques disclosed in PTL 1 and NPL 1 may not perform appropriate feedback.

Several aspects of the present invention have been made in consideration of above points and provide a terminal device, a feedback information generation method, and a base station device that enable appropriate feedback in MIMO transmission.

Means for Solving the Problems (1) One aspect of the present invention provides a terminal device that performs MIMO transmission with a base station device, the terminal device including: a channel estimation unit that estimates channel state information between the terminal device and the base station device; a decomposition processing unit that performs a decomposition process for the channel state information to acquire first decomposition information which includes plural singular values and second decomposition information which includes plural right singular vectors which are respectively associated with the plural singular values; a decomposition information replacement unit that mutually replaces portions of the plural singular values to acquire first replacement information and further acquires second replacement information based on the first replacement information and the plural right singular vectors; a conversion processing unit that performs a conversion process for the second replacement information to acquire second conversion information; and a radio transmission unit that notifies the base station device of the second conversion information.

(2) Further, one aspect of the present invention provides the terminal device further including a conversion processing unit that performs a conversion process for the second replacement information to acquire second conversion information, in which the radio transmission unit notifies the base station device of the second conversion information as the information based on the second replacement information.

(3) Further, one aspect of the present invention provides the terminal device, in which the conversion processing unit further performs the conversion process for the first replacement information to acquire first conversion information, and the radio transmission unit further notifies the base station device of the first conversion information.

(4) Further, one aspect of the present invention provides the terminal device, in which in a case where a difference between two singular values which are included in the plural singular values is less than a preset threshold value, the decomposition information replacement unit replaces at least the two singular values and acquires the first replacement information.

(5) Further, one aspect of the present invention provides the terminal device, in which the conversion processing unit further performs the conversion process for the first decomposition information to acquire third conversion information, performs the conversion process for the second decomposition information to acquire fourth conversion information, uses a pair of the first conversion information and the second conversion information and a pair of the third conversion information and the fourth conversion information to perform comparison of errors, and selects the pair with a less error, and the radio transmission unit notifies the base station device of information that is selected by the conversion processing unit as the information based on the second replacement information.

(6) Further, one aspect of the present invention provides the terminal device, in which the conversion process is a time-frequency transform process or a polynomial interpolation process.

(7) Further, one aspect of the present invention provides the terminal device, in which information that is associated with reception quality is calculated based on the first replacement information and the channel state information, and the information that is associated with the reception quality is notified to the base station device.

(8) Further, one aspect of the present invention provides a feedback information generation method in a terminal device that performs MIMO transmission with a base station device, the feedback information generation method including: a step of estimating channel state information between the terminal device and the base station device; a step of acquiring first decomposition information which includes plural singular values by performing decomposition process for the channel state information; a step of acquiring second decomposition information which includes plural right singular vectors which are respectively associated with the plural singular values; a step of acquiring first replacement information by mutually replacing portions of the plural singular values; a step of acquiring second replacement information based on the first replacement information and the plural right singular vectors; and a step of performing a conversion process for the second replacement information.

(9) Further, one aspect of the present invention provides a base station device that performs MIMO transmission with at least one terminal device, the base station device including: a channel state information acquisition unit that acquires plural singular values based on the channel state information between the base station device and the terminal device and plural right singular vectors which are respectively associated with the plural singular values from information which is notified from the terminal device and replaces the plural right singular vectors based on the plural singular values; and a precoding unit that performs precoding for a signal to be transmitted to the terminal device based on the plural right singular vectors for which the replacement is performed.

(10) Further, one aspect of the present invention provides the base station device, in which the channel state information acquisition unit replaces the plural right singular vectors based on the plural singular values such that a channel capacity of radio resources that are used for transmission of the signal from the base station device to the terminal device becomes a maximum.

(11) Further, one aspect of the present invention provides a terminal device including: a channel estimation unit that estimates channel state information between the terminal device and the base station device in which MIMO transmission is performed, the channel state information for each subcarrier; and a radio transmission unit that notifies the base station device of information which is based on the channel state information and which has a first subcarrier element and a second subcarrier element, in which in the information, with respect to a singular value based on the channel state information, the singular value that corresponds to the first subcarrier element and the singular value that corresponds to the second subcarrier element are different in a magnitude order of values in each of the subcarriers.

Effects of the Invention

Several aspects of the present invention enable appropriate feedback in MIMO transmission.

MODE FOR CARRYING OUT THE INVENTION

Embodiments of the present invention will hereinafter be described with reference to attached drawings. It should be noted that the attached drawings illustrate specific embodiments and implementation examples that follow principles of the present invention; however, those are for understanding of the present invention and are never used to limitedly construe the present invention.

A description will be made on an assumption that a base station device performs orthogonal frequency division multiplex (OFDM) transmission with the number of subcarriers being Nc. However, another transmission scheme (access scheme) may be used. For example, the base station device may use a single carrier based transmission scheme such as single carrier-frequency division multiple access (SC-FDMA). Further, as for feedback information that is related to channel state information from the terminal device to the base station device, the transmission scheme is not limited. The terminal device may use the OFDM transmission or the SC-FDMA, for example, as a transmission scheme for feedback information.

First Embodiment

Figure 1:
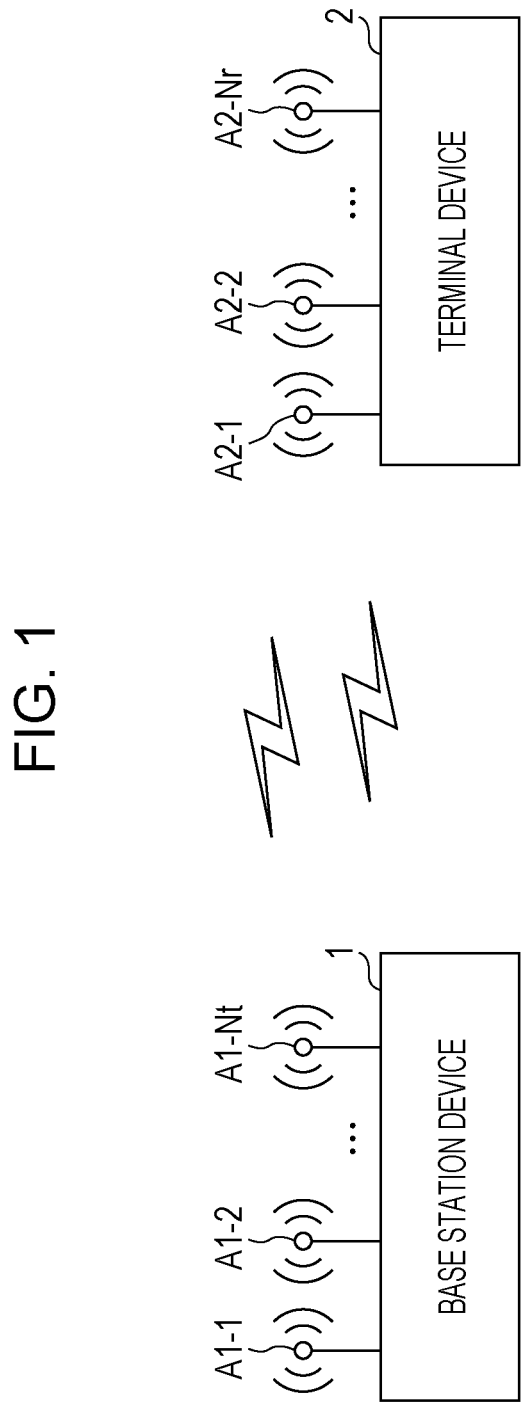
FIG. 1 is a schematic diagram that illustrates a configuration of a communication system according to a first embodiment of the present invention.

FIG. 1 is a schematic diagram that illustrates a configuration of a communication system according to a first embodiment of the present invention. In this drawing, a base station device 1 (base station (BS)) includes Nt antennas A1-1 to A1-Nt, and a terminal device 2 (user equipment (UE)) includes Nr antennas A2-1 to A2-Nr. Nt and Nr are integers of one or more. In a case where either one of Nt and Nr is one, the other one becomes two or more. FIG. 1 exemplifies a case of single user multiple input multiple output (SU-MIMO) transmission. In FIG. 1, one terminal device 2 is connected with one base station device 1, and data transmission is performed. However, plural terminal devices 2 may be present, and the base station device 1 is connected with each of the terminal devices 2 in a case of the SU-MIMO.

Figure 2:
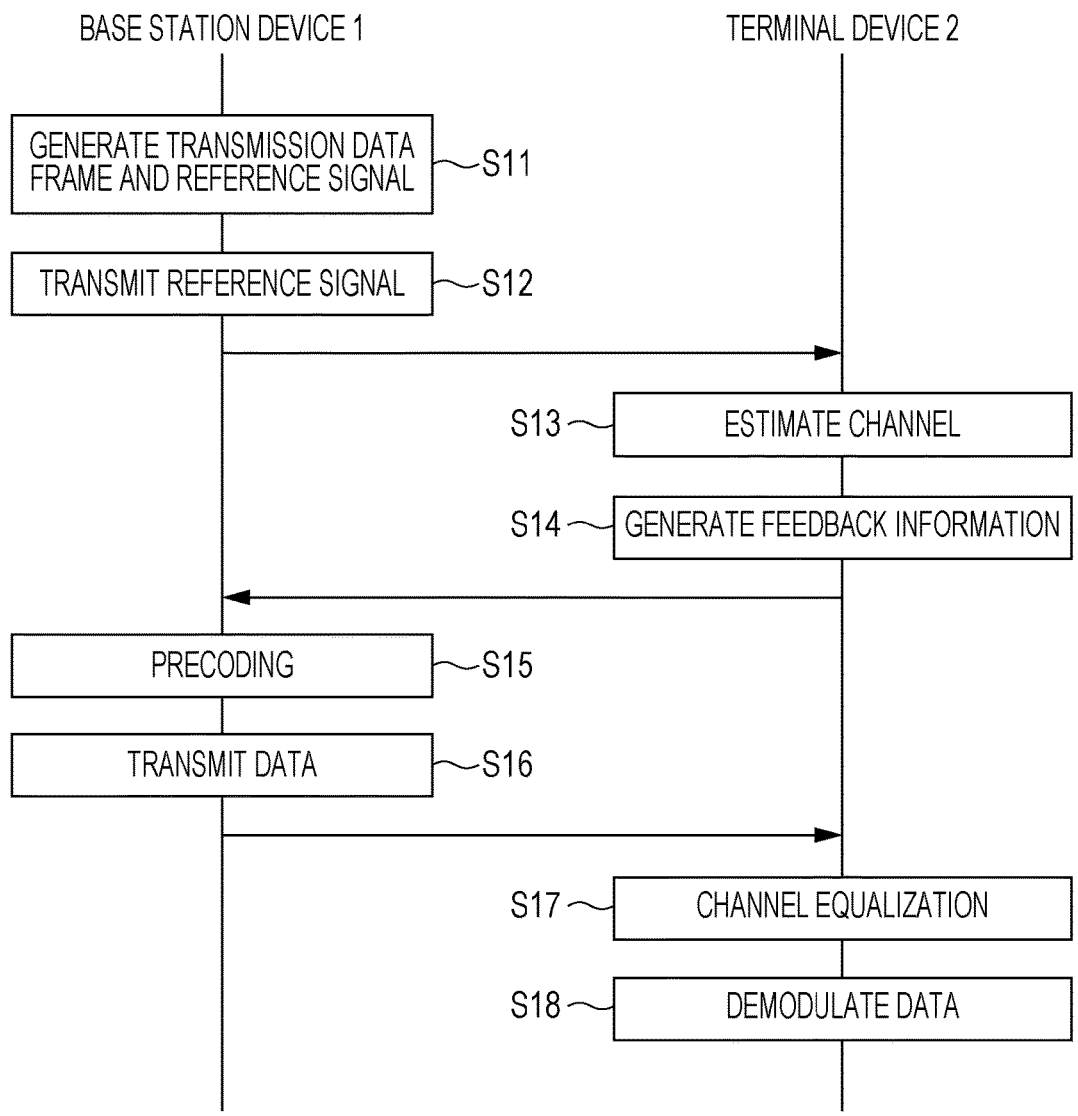
FIG. 2 is a sequence diagram that illustrates one example of a process of the communication system according to this embodiment.

FIG. 2 is a sequence diagram that illustrates one example of a process of the communication system according to this embodiment.

(Step S11) The base station device 1 generates a transmission data sequence and a reference signal. Here, the reference signal (RS) is a known signal to the base station device 1 and the terminal device 2. The process thereafter progresses to step S12.

(Step S12) The base station device 1 transmits the reference signal that is generated in step S11. The process thereafter progresses to step S13.

(Step S13) The terminal device 2 receives the reference signal that is transmitted in step S12. The terminal device 2 estimates a channel by using the received reference signal and generates channel state information based on an estimation result. The channel state information is a reception quality or received power about each of the channels between the antennas A1-1 to A1-Nt and the antennas A2-1 to A2-Nr, for example. The process thereafter progresses to step S14.

(Step S14) The terminal device 2 generates feedback information, by which the base station device 2 performs precoding, by using the channel state information generated in step S13. Here, the terminal device 2 performs singular value decomposition of a channel matrix Hk with respect to each subcarrier k, for example. The terminal device 2 decides combinations of the ith singular value for all subcarriers (which correspond to $\Lambda'_i$ described later) based on the ith singular value $\lambda_{k,i}$ (i=1 to Ni: Ni is the number of the singular values) in each of the subcarriers k. For example, the combinations of the singular values include combinations in which the magnitude orders of the singular values are different among the subcarriers k. That is, in a case where singular value $\lambda_{k,i} > \lambda_{k,i+1}$, the combinations of the singular values include the ith and jth singular values whose orders are different such as $\{\lambda'_{1,i}, \lambda'_{2,i}, \ldots, \lambda'_{k,i}, \ldots\} = \{\lambda_{1,i}, \lambda_{2,i}, \ldots, \lambda_{k,j}, \ldots\}$ (i≠j). k is also referred to as the subcarrier number (subcarrier index) and the subcarrier k is referred to as a kth subcarrier or the subcarrier in the kth position.

The terminal device 2 calculates a right singular vector $V'_k$ that corresponds to the singular value in the decided combination and generates the feedback information based on the calculated $V'_k$. The terminal device 2 notifies (feeds back to) the base station device 1 of the feedback information generated in step S14. The process thereafter progresses to step S15.

(Step S15) The base station device 1 modulates the transmission data sequence to be transmitted to the terminal device 2 and thereby generates a modulation symbol. The base station device 1 performs the precoding for the generated modulation symbol by using the feedback information that is notified from the terminal device 2. Here, the base station device 1 generates a precoding matrix $W'_{t,k}$ based on the feedback information. The base station device 1 multiplies a signal of each layer, which is generated from the modulation symbol, by the precoding matrix $W'_{t,k}$ and thereby performs the precoding. The process thereafter progresses to step S16.

(Step S16) The base station device 1 generates a radio signal based on the signal for which the precoding is performed in step S15 and transmits the generated radio signal to the terminal device 2. That is, the base station device 1 transmits data that are addressed to the terminal device 2. The process thereafter progresses to step S17.

(Step S17) The terminal device 2 receives the radio signal that is transmitted in step S16. The terminal device 2 performs channel equalization for the received radio signal and thereby generates a signal. Specifically, the terminal device 2 generates a receive filter $W'_{r,k}$ based on the channel matrix Hk and the right singular vector $V'_k$. The terminal device 2 multiplies a signal of each antenna port of an antenna A2-$m$ by the generated receive filter $W'_{r,k}$ and thereby performs the channel equalization. The process thereafter progresses to step S18.

(Step S18) The terminal device 2 demodulates the signal generated in step S17 and thereby acquires the data addressed to the terminal device 2.

<Base Station Device 1>

Figure 3:
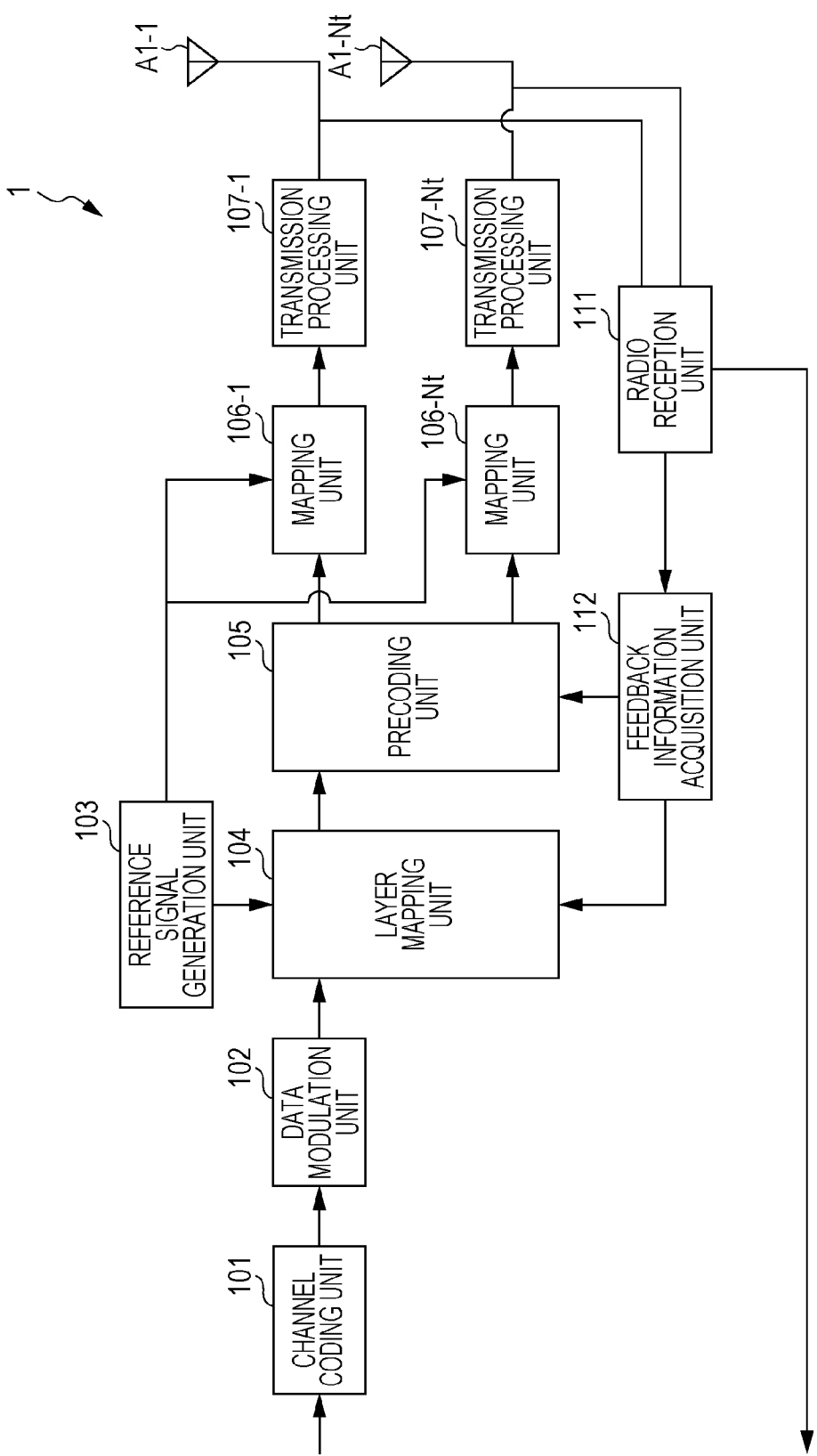
FIG. 3 is a schematic block diagram that illustrates a configuration of a base station device according to this embodiment.

FIG. 3 is a schematic block diagram that illustrates a configuration of the base station device 1 according to this embodiment. In this drawing, the base station device 1 is configured to include a channel coding unit 101, a data modulation unit 102, a reference signal generation unit 103, a layer mapping unit 104, a precoding unit 105, Nt mapping units 106-1 to 106-Nt, Nt transmission processing units 107-1 to 107-Nt, the Nt antennas A1-1 to A1-Nt, a radio reception unit 111, and a feedback information acquisition unit 112.

The channel coding unit 101 performs channel coding for the transmission data sequence that is input. Specifically, the channel coding unit 101 performs coding by a forward error correction code and thereby gives redundancy to the transmission data sequence. Accordingly, the terminal device 2 may enhance error correction performance. Examples of the forward error correction codes may include a convolutional code, a turbo code, and so forth. The channel coding unit 101 may include a function of performing interleaving (scrambling) for rearranging a data sequence. The channel coding unit 101 outputs the data sequence for which the channel coding is performed to the data modulation unit 102.

The data modulation unit 102 performs modulation such as quadrature phase shift keying (QPSK), 16 quadrature amplitude modulation (16 QAM), 64 QAM, or 256 QAM for the data sequence that is input from the channel coding unit 101 and thereby generates the modulation symbol. The data modulation unit 102 outputs the generated modulation symbol to the layer mapping unit 104.

The reference signal generation unit 103 generates a reference signal. The reference signal generation unit 103 generates a channel state information reference signal (CSI-RS) for performing channel estimation, a demodulation reference signal (DM-RS) for demodulation, and so forth as the reference signals, for example. The reference signal generation unit 103 outputs the channel state reference signal that is transmitted from each of the antennas A1-$n$ (n=1 to Nt) to the mapping unit 106-$n$ that corresponds to the antenna port of the antenna A1-$n$. The reference signal generation unit 103 outputs the demodulation reference signal to the layer mapping unit 104.

The layer mapping unit 104 arranges the modulation symbol that is input from the data modulation unit 102 to L layers (L is an integer of one or more; in this embodiment, L=1). Here, the layer mapping unit 104 arranges the demodulation reference signal that is input from the reference signal generation unit 103 to the L layers. The layer mapping unit 104 may decide the number of layers and may decide an arrangement method of the signal to each layer 1 (1=1 to L) based on the feedback information. The layer mapping unit 104 outputs the signal of each of L layers to the precoding unit 105.

The precoding unit 105 performs the precoding for the signal that is input from the layer mapping unit 104. Here, the precoding unit 105 generates the precoding matrix $W'_{t,k}$ based on the channel-related information that is input from the feedback information acquisition unit 112. The precoding unit 105 uses the generated precoding matrix $W'_{t,k}$ to perform the precoding by using maximum ratio combining (MRC), for example. However, the present invention is not limited to this. The precoding unit 105 may perform the precoding by using a maximum ratio combining transmission/reception diversity scheme, the eigenmode transmission, or beamforming transmission based on a zero-forcing (ZF) reference or a minimum mean squared error reference.

The precoding unit 105 converts the signal of each of the L layers into a signal of each of the Nt antenna ports by the precoding. The precoding unit 105 outputs the signal that is transmitted from the antenna A1-$n$ to the mapping unit 106-$n$ that corresponds to the antenna port of the antenna A1-$n$.

The mapping unit 106-$n$ arranges the signal input from the precoding unit 105 to a radio resource (for example, a resource element) of frequency and time that is used by the antenna A1-$n$ based on mapping information that is in advance stored. Here, the mapping unit 106-$n$ multiplexes the channel state reference signal that is input from the reference signal generation unit 103. The mapping unit 106-$n$ performs arrangement of the signal based on the reception quality of the connected terminal device 2 or the orthogonality of the channels between the antennas A1-1 to A1-Nt and the antennas A2-1 to A2-Nr. The mapping unit 106-$n$ outputs the signal that is arranged to the radio resource to the transmission processing unit 107-$n$.

The transmission processing unit 107-$n$ converts the signal that is input from the mapping unit 106-$n$ to a radio signal of an OFDM scheme. Specifically, the transmission processing unit 107-$n$ performs inverse fast Fourier transform (IFFT) of Nc points for the signal input from the mapping unit 106-$n$. However, the transmission processing unit 107-$n$ may make the IFFT size larger than Nc for a null carrier. The null carrier is, for example, a guard band that is placed for avoiding interference from other component carriers or channels or is placed for removing a direct current (DC) offset or for other reasons.

The transmission processing unit 107-$n$ adds a guard interval (GI) to the signal resulting from performance of the IFFT. Further, the addition of the GI enables the terminal device 2 to avoid inter symbol interference (ISI).

The transmission processing unit 107-$n$ performs digital/analog (D/A) conversion for the signal resulting from the addition of the GI. The transmission processing unit 107-$n$ converts (up-converts) the signal resulting from the D/A conversion to a signal at a carrier frequency and thereby generates a radio signal in a radio frequency (RF) band. The transmission processing unit 107-$n$ outputs the generated radio signal to the antenna port of the antenna A1-$n$. The output radio signal is transmitted to the terminal device 2 via the antenna A1-$n$.

The radio reception unit 111 receives the radio signal that is transmitted from the terminal device 2 via a portion or all of the antennas A1-1 to A1-$n$. The radio reception unit 111 converts (down-converts) the received radio signal to a signal at a baseband frequency and performs analog/digital (A/D) conversion. The radio reception unit 111 demodulates and decodes the signal resulting from the A/D conversion and thereby acquires data from the terminal device 2. The radio reception unit 111 outputs the acquired data to the feedback information acquisition unit 112 or an external portion.

The feedback information acquisition unit 112 acquires the feedback information from the data that are input from the radio reception unit 111. The feedback information acquisition unit 112 outputs the acquired feedback information to the layer mapping unit 104 and the precoding unit 105 as the channel-related information.

<Terminal Device 2>

Figure 4:
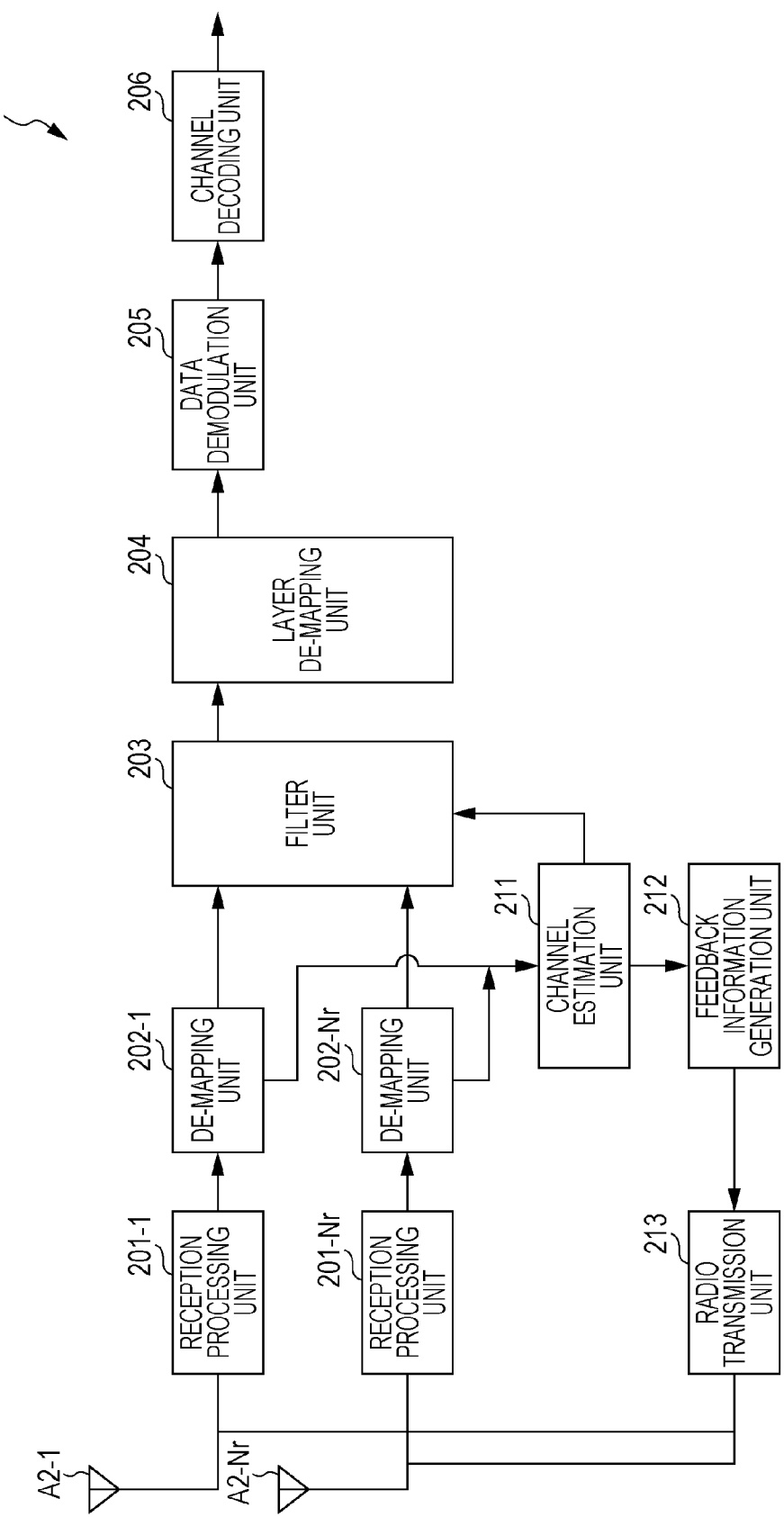
FIG. 4 is a schematic block diagram that illustrates a configuration of a terminal device according to this embodiment.

FIG. 4 is a schematic block diagram that illustrates a configuration of the terminal device 2 according to this embodiment. In this drawing, the terminal device 2 is configured to include the Nr antennas A2-1 to A2-Nr, Nr reception processing units 201-1 to 201-Nr, Nr de-mapping units 202-1 to 202-Nr, a filter unit 203, a layer de-mapping unit 204, a data demodulation unit 205, a channel decoding unit 206, a channel estimation unit 211, a feedback information generation unit 212, and a radio transmission unit 213.

The reception processing unit 201-$m$ (m=1 to Nr) receives the radio signal transmitted from the base station device 1 via an antenna port of the antenna A2-$m$. The reception processing unit 201-$m$ performs analog signal processing and various kinds of analog filtering for the received radio signal and converts (down-converts) the radio signal to a signal at the baseband frequency. The reception processing unit 201-$m$ performs the A/D conversion for the converted signal and removes the GI from the signal resulting from the A/D conversion. The reception processing unit 201-$m$ performs fast Fourier transform (FFT) of $N_c$ points for the signal from which the GI is removed. The reception processing unit 201-$m$ outputs the signal resulting from the performance of the FFT to the de-mapping unit 202-$m$.

The de-mapping unit 202-$m$ demultiplexes the signal input from the reception processing unit 201-$m$ into the channel state reference signal and the other signals based on the mapping information that is in advance stored. The de-mapping unit 202-$m$ outputs the channel state reference signal that is received by the antenna A2-$m$ to the channel estimation unit 211. The de-mapping unit 202-$m$ outputs the other signals to the filter unit 203.

The filter unit 203 performs the channel equalization for the signals that are input from the de-mapping units 202-1 to 202-Nr based on the channel state information that is input from the channel estimation unit 210 described later and the feedback information that is generated by the feedback information generation unit 212. The ZF reference, the MMSE reference, and so forth may be used for the channel equalization. The filter unit 203 outputs the signal which results from the channel equalization and is of each of the layers 1 to the layer de-mapping unit 204.

The layer de-mapping unit 204 extracts the modulation symbol from the signal that is input from the filter unit 203. The layer de-mapping unit 204 outputs the extracted modulation symbol to the data demodulation unit 205.

The data demodulation unit 205 performs demodulation by the modulation scheme that is used by the data modulation unit 102 for the modulation symbol that is input from the layer de-mapping unit 204 and thereby calculates a bit log likelihood ratio (LLR). The data demodulation unit 205 outputs the calculated bit log likelihood ratio to the channel decoding unit 206.

The channel decoding unit 206 performs a decoding process for a data sequence that is input from the data demodulation unit 205 in accordance with the channel decoding scheme that is used by the channel coding unit 101. Specifically, the channel decoding unit 206 performs a decoding process of the forward error correction code. In a case where the base station device 1 performs the interleaving for the data sequence, the channel decoding unit 206 performs de-interleaving that is the inverse operation of the interleaving for a bit LLR sequence and thereafter performs error correction decoding.

The channel decoding unit 206 outputs the data sequence resulting from the decoding process to a medium access control (MAC) layer or the like, which performs retransmission control or the like.

The channel estimation unit 211 generates the channel state information based on the channel state reference signal that is input from the de-mapping unit 202-$m$. The channel estimation unit 211 outputs the generated channel state information to the feedback information generation unit 212 and the filter unit 203.

The feedback information generation unit 212 generates the feedback information based on the channel state information that is input from the channel estimation unit 211. The feedback information generation unit 212 outputs the generated feedback information to the filter unit 203 and the radio transmission unit 213.

The radio transmission unit 213 performs coding and modulation for the feedback information that is input from the feedback information generation unit 212 and thereby generates the modulation symbol. The radio transmission unit 213 performs the D/A conversion for the generated modulation symbol to convert (up-convert) the modulation symbol to a signal at a carrier frequency and thereby generates a radio signal in an RF band. The radio transmission unit 213 transmits the generated radio signal to the base station device 1 via a portion or all of the antennas A2-1 to A2-Nr.

<Feedback Information Generation Unit 212>

Figure 5:
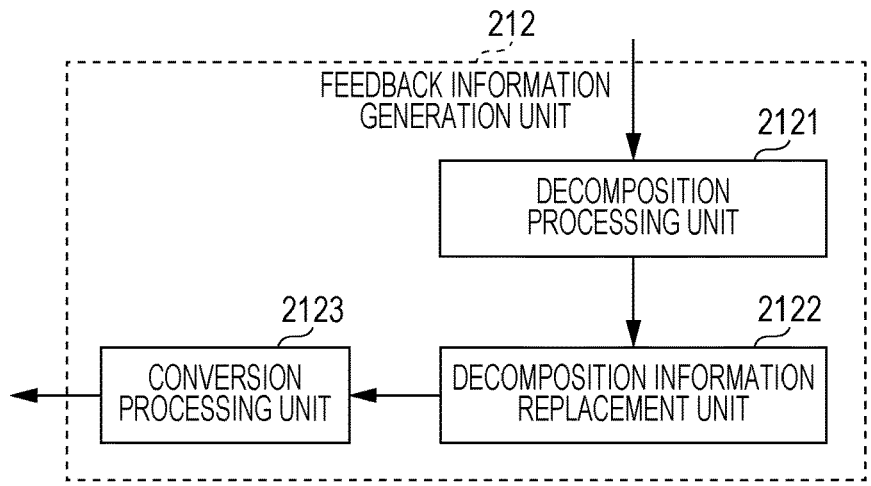
FIG. 5 is a schematic block diagram that illustrates a configuration of a feedback information generation unit according to this embodiment.

FIG. 5 is a schematic block diagram that illustrates a configuration of the feedback information generation unit 212 according to this embodiment. In this drawing, the feedback information generation unit 212 is configured to include a decomposition processing unit 2121, a decomposition information replacement unit 2122, and a conversion processing unit 2123.

The channel matrix Hk of formula (1) as the channel state information of the subcarrier k is input to the decomposition processing unit 2121.

[Expression 1]

$$H_k = \begin{pmatrix} h_{1,1,k} & \cdots & h_{1,N_t,k} \\ \vdots & \ddots & \vdots \\ h_{N_r,1,k} & \cdots & h_{N_r,N_t,k} \end{pmatrix} \quad (1)$$

Here, m and n are respective indices related to the element (mth row and nth column) of the matrix. $h_{m,n,k}$ represents a channel gain between the antenna A1-$n$ of the base station device and the antenna A2-$m$ of the terminal device in the kth subcarrier.

The decomposition processing unit 2121 performs the singular value decomposition (decomposition process) for the channel matrix $H_k$ of formula (1). Accordingly, the decomposition processing unit 2121 calculates matrices $U_k$, $\Sigma_k$, and $V_k$ that are expressed in formula (2).

[Expression 2]

$$H_k = U_k \cdot \Sigma_k \cdot V_k^H \quad (2)$$

Here, the matrix $U_k$ is an Nr×Nr unitary matrix (also referred to as left singular matrix) that is formed with a left singular vector, and the matrix $E_k$ is an Nr×Nt matrix (also referred to as singular value matrix) that is formed with a diagonal matrix or the diagonal matrix and a zero matrix. The matrix $V_k$ is an Nt×Nt unitary matrix (also referred to as right singular matrix) that is formed with the right singular vector. A superscript H of the matrix $V_k$ represents complex conjugate transpose (Hermitian). Further, the matrix $\Sigma_k$ will also be referred to as first decomposition information, the matrix Vk will also be referred to as second decomposition information. Plural right singular vectors are respectively associated with plural singular values in formula (2).

The decomposition processing unit 2121 arranges diagonal elements of the matrix $\Sigma_k$ in the descending order. That is, as expressed by formula (3), the element of the ith row and the ith column of the diagonal elements of the matrix $\Sigma_k$ is the singular value $\lambda_{k,i}$, and the relationship between the element $\lambda_{k,i}$ of the ith row and the ith column and the element $\lambda_{k,i+1}$ of the i+1th row and the i+1th column is $\lambda_{k,i} > \lambda_{k,i+1}$. The order of arranging the singular values in the descending order will also be referred to as first ordering. The singular value $\lambda_{k,i}$ is the ith largest singular value in the subcarrier k (the singular value $\lambda_{k,i}$ will also be referred to as the ith singular value).

[Expression 3]

$$\Sigma_k = \begin{pmatrix} \lambda_{k,1} & 0 & \cdots & 0 & \cdots \\ 0 & \lambda_{k,2} & \cdots & 0 & \cdots \\ \cdots & \cdots & \cdots & \cdots & \cdots \\ 0 & 0 & \cdots & \lambda_{k,i} & \cdots \\ \cdots & \cdots & \cdots & \cdots & \cdots \end{pmatrix} \quad (3)$$

where $\lambda_{k,1} > \lambda_{k,2} > \ldots > \lambda_{k,i} > \lambda_{k,i+1} > \ldots > \lambda_{k,N_e}$ The decomposition processing unit 2121 calculates the matrices $U_k$, $\Sigma_k$, and $V_k$ with respect to the subcarrier k as a calculation target and outputs information that indicates the calculated matrices $U_k$, $\Sigma_k$, and $V_k$ to the conversion processing unit 2123.

The decomposition information replacement unit 2122 extracts the singular value $\lambda_{k,i}$ from the matrix $\Sigma$k that is input from the decomposition processing unit 2121. The decomposition information replacement unit 2122 decides singular value combinations $\Lambda'$i for all subcarriers based on the ith singular value $\lambda_{k,i}$ and the jth (i≠j) singular value $\lambda_{k,j}$ in the same subcarrier k.

Specifically, the decomposition information replacement unit 2122 generates a column vector Dk={$\lambda_{k,1}$, $\lambda_{k,2}$, ... $\lambda_{k,Ne}$} in which the singular values are arranged based on the first ordering in each of the subcarriers k. The decomposition information replacement unit 2122 makes a determination whether the singular values are in proximity to each other (proximity determination) in each of the subcarriers k. The decomposition information replacement unit 2122 replaces the relationships between the orders of the singular values and the elements (components) of the column vector for subcarriers k+1 or larger based on the determination result and thereby generates a column vector D'$_k$. The column vector D'k is expressed by following formula (4) by using a permutation matrix $\Sigma$k.

[Expression 4]

$$D'_{k+1} = E_{k+1} \cdot D_{k+1} \quad (4)$$

This permutation matrix $E_{k+1}$ is a matrix that replaces (permutates or rearranges) the i1th element by the i1+1th element with respect to the column vector $D_{k1}$, for example, in a case where a determination is made that the singular value $\lambda_{k1,i1}$ of the i1th element is in proximity to the singular value $\lambda_{k1,i1+1}$ of the i1+1th element. For example, in the column vector D'$_{k1+1}$, the i1th element becomes and the i1+1th element becomes $\lambda_{k1,i1}$. In other words, in the column vector D'$_{k1+1}$, the singular value $\lambda_{k1,i}$ of the i+1th element is larger than the singular value $\lambda_{k1,i+1}$ of the ith element (the singular value of the ith element is smaller than the singular value $\lambda_{k1,i}$ of the i+1th element).

Further, $E_k$ is a diagonal matrix in which the diagonal components with respect to k=1 to k1 are one, and k=k1+1 to $N_c$ is a permutation matrix that permutates the i1th element with the i1+1th element of the column vector. For example, with respect to k=k1+2 to Nc in the column vector $D'_k$, the i1th element is replaced by the i1+1th element similarly. That is, the decomposition information replacement unit 2122 replaces the elements of the column vector Dk and thereby replaces the orders with respect to i of the singular values $\lambda_{k1,i}$ to $\lambda_{k1,i}$ in the subcarriers k1+2 to Nc (also referred to as order replacement process; see FIG. 7 and FIG. 8). In the description made below, the order replacement process of the decomposition information replacement unit 2122 will be described in detail.

Figure 6:
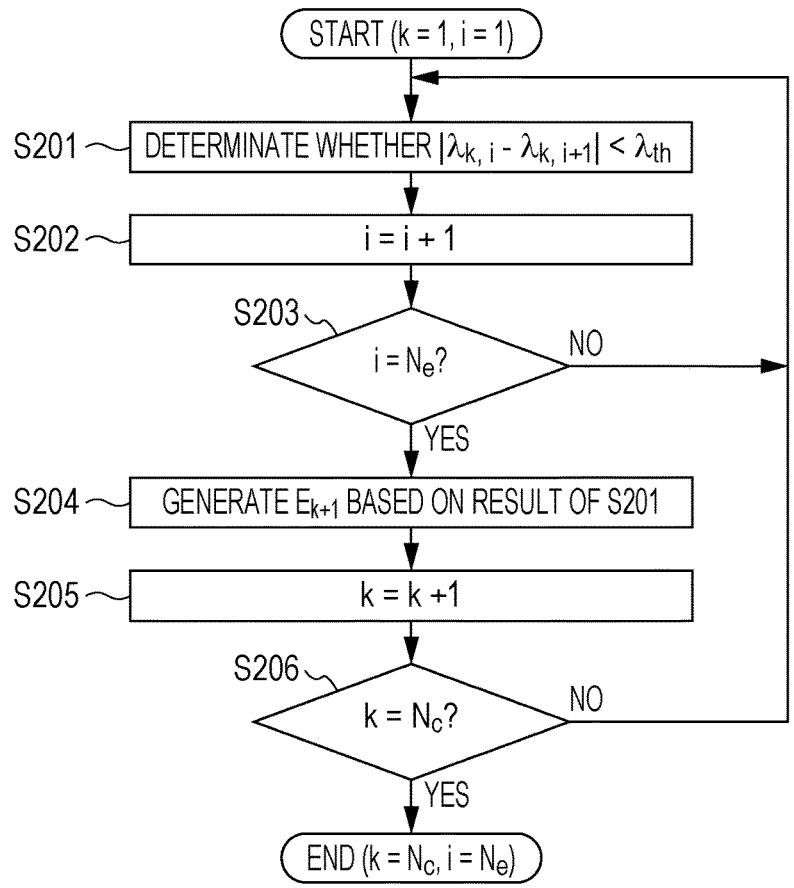
FIG. 6 is a flowchart that illustrates one example of an order replacement process of a decomposition information replacement unit according to this embodiment.

FIG. 6 is a flowchart that illustrates one example of the order replacement process of the decomposition information replacement unit 2122 according to this embodiment. In the order replacement process in this drawing, the decomposition information replacement unit 2122 substitutes 1 for the subcarrier k and substitutes 1 for a number i of the singular value (the information for identifying the singular value; the number i that indicates the ith singular value) when the order replacement process starts. The decomposition information replacement unit 2122 thereafter starts the order replacement process of step S201.

(Step S201) The decomposition information replacement unit 2122 determines whether or not $|\lambda_{k,i}-\lambda_{k,i+1}|<\lambda_{th}$ (the proximity determination). That is, a determination is made whether or not the difference between the singular values $\lambda_{k,i}$ and $\lambda_{k,i+1}$ (the absolute value of the difference) is smaller than $X_{th}$. For example, in first step S201, the decomposition information replacement unit 2122 performs the proximity determination about the first element and the second element of $D_k$, that is, the first singular value and the second singular value with respect to the first subcarrier. Here, $\lambda_{th}$ is a preset threshold value, and the decomposition information replacement unit 2122 reads out $\lambda_{th}$ from a storage unit.

Note that the proximity determination is not limited to this. For example, the decomposition information replacement unit 2122 may make a determination about the ratio of those, that is, whether or not $\lambda_{th1}<(\lambda_{k,i}/\lambda_{k,i+1})\le\lambda_{th2}$. Further, the decomposition information replacement unit 2122 may make a determination about the difference between squared values (eigenvalues) of those, that is, whether or not $|(\lambda_{k,i})^2-(\lambda_{k,i+1})^2|<\lambda_{th}$. The decomposition information replacement unit 2122 stores the determination result in the storage unit. The process thereafter progresses to step S202.

(Step S202) The decomposition information replacement unit 2122 substitutes i+1 for i and thereby performs update of making i=i+1. The process thereafter progresses to step S203.

(Step S203) The decomposition information replacement unit 2122 determines whether or not i=Ne. Here, Ne is the number of the singular values. Note that Ne may be the number of layers. In a case where i=Ne (YES), the process progresses to step S204. In other cases (NO), for example, in a case where i<Ne, the process returns to step S201.

(Step S204) The decomposition information replacement unit 2122 reads out the determination result of step S201 and $E_k$ from the storage unit and generates $E_{k+1}$ based on the determination result that is read out. A description will be made about a case where a determination is made that $|\lambda_{k1,i1}-\lambda_{k1,i1+1}|<\lambda_{th}$ given that k=k+1 and i=k1, that is, a case where a determination is made that the i1th singular value $\lambda_{k1,i1}$ is in proximity to the i1+1th singular value $\lambda_{k1,i1+1}$, for example. In this case, the decomposition information replacement unit 2122 reads out $E_{k1}$ from the storage unit, replaces the i1th row by the i1+1th row of $E_{k1}$, and thereby generates a matrix $E_{k1+1}$. Those replaced rows work to replace the i1th column by the i1+1th column of a column vector in a case where a column vector is multiplied by the replaced rows. For example, the decomposition information replacement unit 2122 generates the matrix $E_{k1+1}$ of following formula (6) from the matrix $E_{k1}$ of following formula (5).

[Expression 5]

$$E_{k1} = \begin{pmatrix} \cdots & \cdots & \cdots & \cdots \\ \cdots & 1 & 0 & \cdots \\ \cdots & 0 & 1 & \cdots \\ \cdots & \cdots & \cdots & \cdots \end{pmatrix} \quad (5)$$

$$E_{k1+1} = \begin{pmatrix} \cdots & \cdots & \cdots & \cdots \\ \cdots & 0 & 1 & \cdots \\ \cdots & 1 & 0 & \cdots \\ \cdots & \cdots & \cdots & \cdots \end{pmatrix} \quad (6)$$

On the other hand, in a case where a determination is made that $|\lambda_{k1,i1}-\lambda_{k1,i1+1}|\ge\lambda_{th}$ with respect to every i, the decomposition information replacement unit 2122 generates the same matrix $E_{k+1}$ as the matrix $\Sigma k$ that is stored in the storage unit.

The decomposition information replacement unit 2122 stores the generated matrix $E_{k1+1}$ in the storage unit. The process thereafter progresses to step S205.

(Step S205) The decomposition information replacement unit 2122 substitutes k+1 for k and thereby performs update of making k=k+1. The process thereafter progresses to step S206.

(Step S206) The decomposition information replacement unit 2122 determines whether or not k=$N_c$. In a case where k=Nc (YES), the order replacement process is finished. In other cases (NO), for example, in a case where k<Nc, the process returns to step S201.

In a case where the order replacement process is finished, k=$N_c$ and i=$N_e$ are obtained.

After finishing the order replacement process, the decomposition information replacement unit 2122 multiplies the matrix Dk by the matrix $\Sigma k$ stored in the storage unit from the left and thereby generates $D'_k$ (=$E_k D_k E_k$) (see formula (4)). The decomposition information replacement unit 2122 uses the generated $D'_k$ to define the diagonal matrix as $\Sigma'_k$=diag ($D'_k$) and to define the singular value of the ith row and the ith column of $\Sigma'_k$ as $\lambda'_{k,i}$. That is, for example, $\lambda'_{k,i1}=\lambda_{k,i1+1}$ and $\lambda'_{k,i1+1}=\lambda_{k,i1}$ are obtained.

Figure 7:
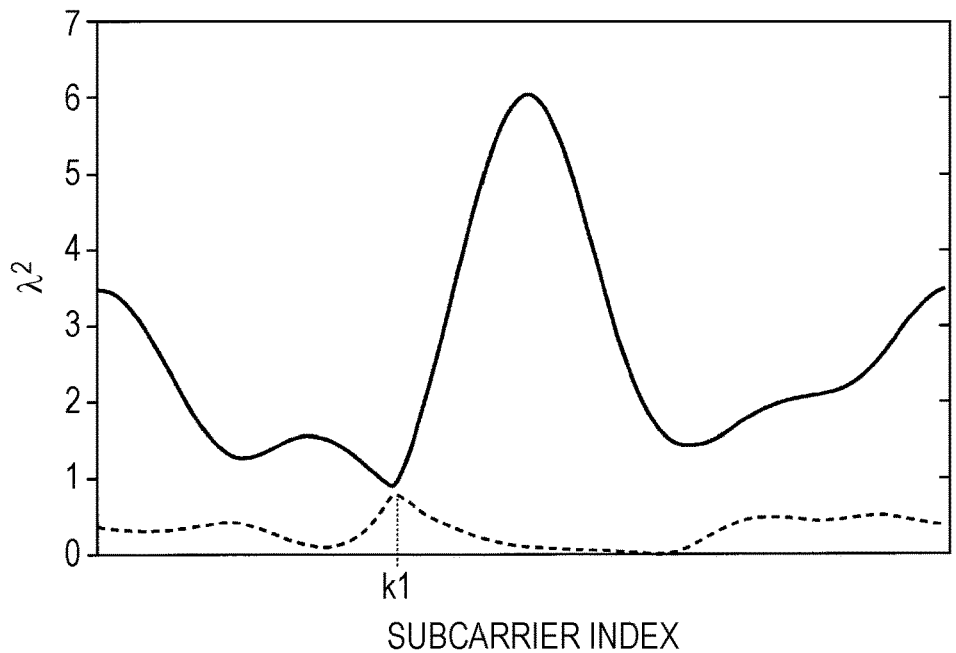
FIG. 7 is a schematic diagram that illustrates one example of the order replacement process of the decomposition information replacement unit according to this embodiment.
Figure 8:
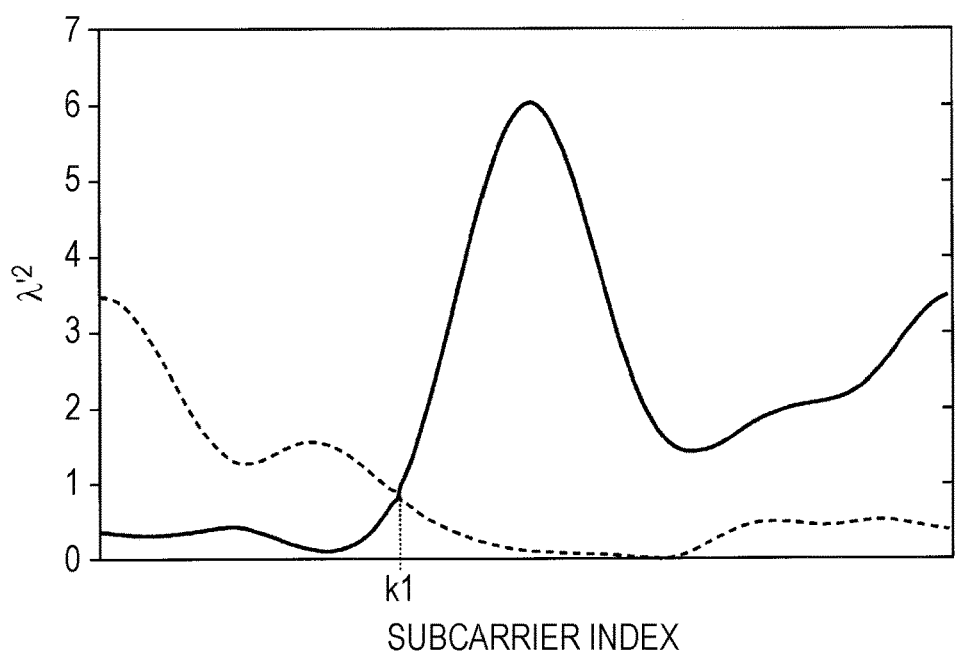
FIG. 8 is another schematic diagram that illustrates one example of the order replacement process of the decomposition information replacement unit according to this embodiment.

FIG. 7 and FIG. 8 are schematic diagrams that illustrate one example of the order replacement process of the decomposition information replacement unit 2122 according to this embodiment. In FIG. 7, the horizontal axis represents the subcarrier number k, and the vertical axis represents the squared value $\lambda_{k,1}^2$ of the singular value. In FIG. 8, the horizontal axis represents the subcarrier number k, and the vertical axis represents the squared value $\lambda'_{k,i}^2$ of the singular value. Because the squared value of the singular value is also the eigenvalue of the correlation matrix of the channel matrix, the squared value of the singular value will also be referred to as eigenvalue. FIG. 7 and FIG. 8 illustrate a case where the number Nr of the antennas of the terminal device 2=2 and two singular values are present. In these drawings, the solid lines represent the first eigenvalue (i=1: maximum eigenvalue) which is the squared value of the first singular value, and the broken lines represent the second eigenvalue ($i=2$: minimum eigenvalue) which is the squared value of the second singular value.

FIG. 7 illustrates the first eigenvalue $\lambda_{k,1}^2 = \{\lambda_{1,1}^2, \lambda_{2,1}^2, \ldots, \lambda_{k1+1,1}^2, \ldots, \lambda_{Nc,1}^2\}$ (solid line) and the second eigenvalue $\lambda_{k,2}^2 = \{\lambda_{1,2}^2, \lambda_{2,2}^2, \ldots, \lambda_{k1+1,2}^2, \ldots, \lambda_{Nc,2}^2\}$ (broken line) with respect to the squared value of the singular value $\lambda_{k,i}$ that is input to the decomposition information replacement unit 2122. In FIG. 7, the first eigenvalue $X_{k,1}^2$ is in proximity to the second eigenvalue $\lambda_{k,2}^2$ in the subcarrier k1. Further, the changes in values of the first eigenvalue $\lambda_{k,1}^2$ and the second eigenvalue $\lambda_{k,2}^2$ become large in a part in which the first eigenvalue $\lambda_{k,1}^2$ is in proximity to the second eigenvalue $\lambda_{k,2}^2$. For example, in the subcarrier k1, the respective difference values (differential values) of the first eigenvalue $\lambda_{k,1}^2$ and the second eigenvalue $\lambda_{k,2}^2$ are large values.

FIG. 8 illustrates the first eigenvalue $\lambda'_{k,1}^2 = \{\lambda'_{1,1}^2, \lambda'_{2,1}^2, \ldots, \lambda'_{k1+1,1}^2, \ldots, \lambda'_{Nc,1}^2\}$ (solid line) and the second eigenvalue $\lambda'_{k,2}^2 = \{\lambda'_{1,2}^2, \lambda'_{2,2}^2, \ldots, \lambda'_{k1+1,2}^2, \ldots, \lambda'_{Nc,2}^2\}$ (broken line) with respect to the squared value of the singular value $\lambda'_{k,i}$ that is generated by the decomposition information replacement unit 2122. Here, the first eigenvalue $\lambda'_{k,1}^2 = \{\lambda'_{1,1}^2, \lambda'_{2,1}^2, \ldots, \lambda'_{k1+1,1}^2, \ldots, \lambda'_{Nc,1}^2\} = \{\lambda_{1,1}^2, \lambda_{2,1}^2, \ldots, \lambda_{k1+1,2}^2, \ldots, \lambda_{Nc,2}^2\}$, and the second eigenvalue $\lambda'_{k,2}^2 = \{\lambda'_{1,2}^2, \lambda'_{2,2}^2, \ldots, \lambda'_{k1+1,2}^2, \ldots, \lambda'_{Nc,2}^2\} = \{\lambda_{1,2}^2, \lambda_{2,2}^2, \ldots, \lambda_{k1+1,1}^2, \ldots, \lambda_{Nc,1}^2\}$. That is, in FIG. 8, when compared to FIG. 7, the decomposition information replacement unit 2122 replaces the first singular value $\lambda_{k,1}$ by the second singular value $\lambda_{k,2}$ in the subcarrier k+1 to Nc and thereby replaces the first eigenvalue $\lambda_{k,1}^2$ by the second eigenvalue $\lambda_{k,2}^2$. The respective changes in values of the first eigenvalue $\lambda'_{k,1}^2$ and the second eigenvalue $\lambda'_{k,2}^2$ of FIG. 8 become small compared to the first eigenvalue $\lambda_{k,1}^2$ and the second eigenvalue $\lambda_{k,2}^2$ of FIG. 7, as the whole or in a part in the vicinity of the subcarrier k1. For example, in the subcarrier k1, the respective difference values (differential values) of the first eigenvalue $\lambda'_{k,1}^2$ and the second eigenvalue $\lambda'_{k,2}^2$ are small values.

In the subcarrier k1, the two eigenvalues become in proximity but do not completely match each other. The decomposition information replacement unit 2122 may convert (modify, correct, or change) the value of the eigenvalue $\lambda'_{k,i}^2$ in a case where the singular values are replaced in the vicinity of the subcarrier k1. For example, the decomposition information replacement unit 2122 converts the value of the eigenvalue $\lambda'_{k,i}^2$ (also referred to as combining process) such that the change in the eigenvalue $\lambda'_{k,i}^2$ with respect to k becomes smooth in the vicinity of the subcarrier k1.

Figure 9:
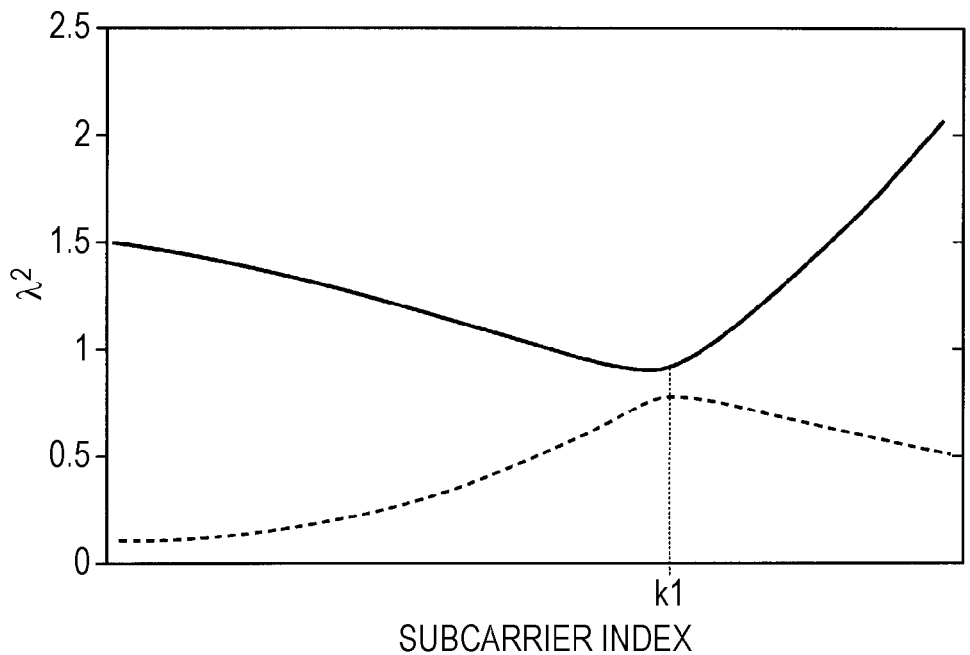
FIG. 9 is a schematic diagram that illustrates one example of a combining process of the decomposition information replacement unit according to this embodiment.
Figure 10:
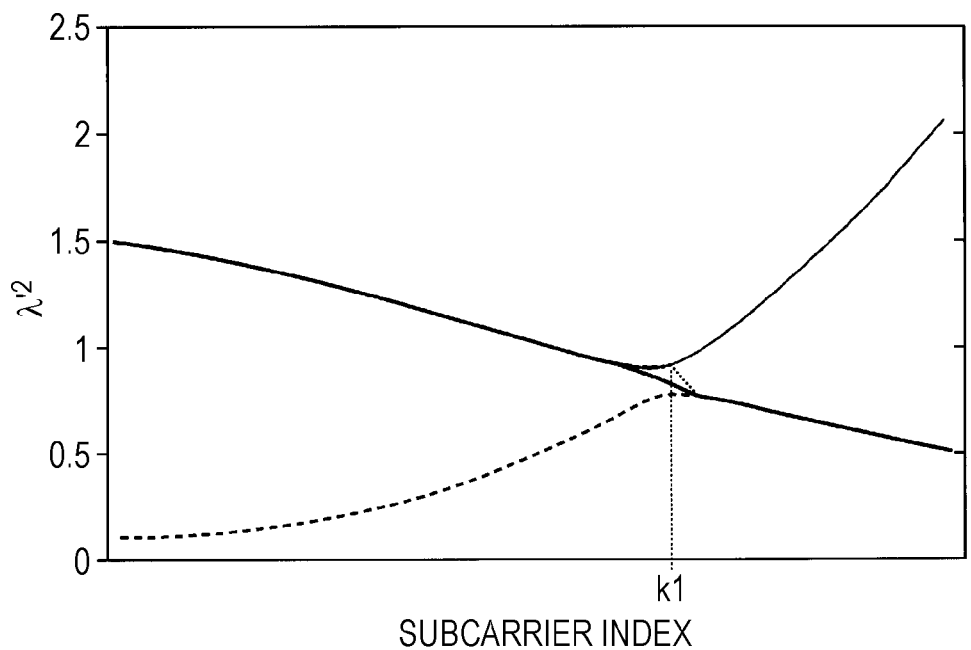
FIG. 10 is another schematic diagram that illustrates one example of the combining process of the decomposition information replacement unit according to this embodiment.

FIG. 9 and FIG. 10 are schematic diagrams that illustrate one example of the combining process of the decomposition information replacement unit 2122 according to this embodiment. FIG. 9 is an enlarged diagram in which a part (the vicinity of the subcarrier k1) where the first eigenvalue $\lambda_{k,1}^2$ is in proximity to the second eigenvalue $\lambda_{k,2}^2$ in FIG. 7 is enlarged. FIG. 10 is an enlarged diagram in which a part (the vicinity of the subcarrier k1) where the first eigenvalue $\lambda'_{k,1}^2$ is in proximity to the second eigenvalue $\lambda'_{k,2}^2$ in FIG. 8 is enlarged.

In FIG. 9, the solid line represents the first eigenvalue ($i=1$), and the broken line represents the second eigenvalue ($i=2$). Further, in FIG. 10, the dotted line represents the first eigenvalue $\lambda'_{k,1}^2$ in a case where the decomposition information replacement unit 2122 does not convert the value of the eigenvalue $\lambda'_{k,1}^2$ (the singular value $\lambda'_{k,1}$) (also referred to as simple inversion). Meanwhile, the solid line represents the first eigenvalue $\lambda'_{k,1}^2$ in a case where the decomposition information replacement unit 2122 converts the value of the eigenvalue $\lambda'_{k,1}^2$ (the singular value $\lambda'_{k,1}$). The broken line represents the second eigenvalue $\lambda'_{k,2}^2$.

In a case where the value of the eigenvalue $\lambda'_{k,1}^2$ is converted, the decomposition information replacement unit 2122 performs linear combination, for example, by using the first eigenvalue $\lambda'_{k,1}^2$ that is close to the subcarrier k1. Specifically, the decomposition information replacement unit 2122 performs the linear combination by performing approximation by the least squares method. The decomposition information replacement unit 2122 selects the first eigenvalue $\lambda'_{k,1}^2$ from $k=k1-k_r$ to $k=k1+k_r$, uses the selected first eigenvalue $\lambda'_{k,1}^2$, and thereby performs the approximation by the least squares method. Here, $k_r$ is a predetermined range. Accordingly, the decomposition information replacement unit 2122 may make the change in the eigenvalue $\lambda'_{k,1}^2$ with respect to k become smooth in the vicinity of the subcarrier k1. For example, in FIG. 10, comparing a case of performing conversion of the eigenvalue $\lambda'_{k,1}^2$ (solid line) with a case of not performing the conversion (broken line), the change in the slope of the eigenvalue $\lambda'_{k,1}^2$ to k (the differential value) is reduced in the case of performing the conversion.

Figure 11:
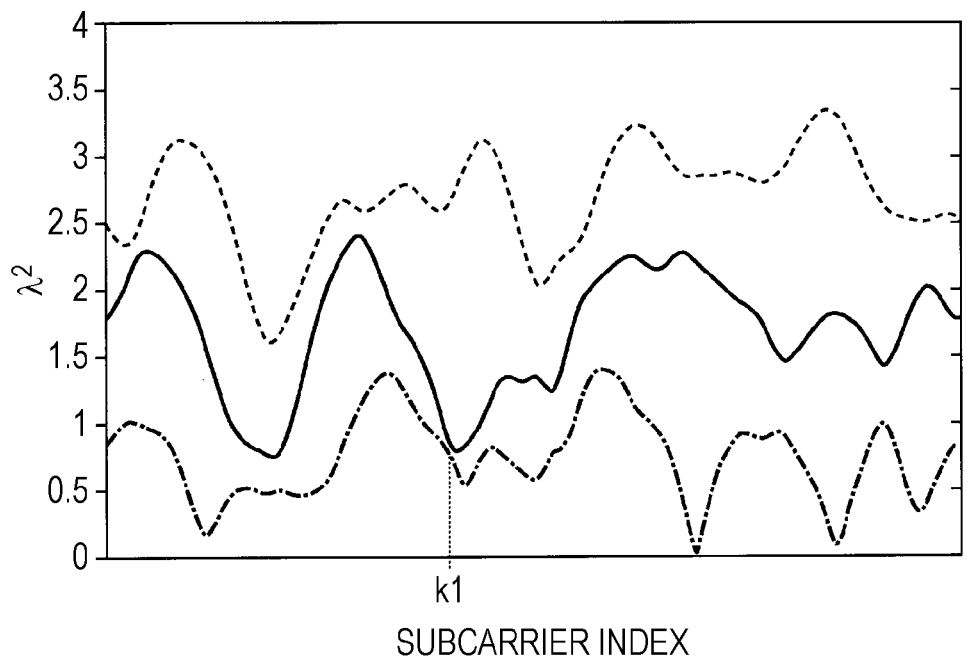
FIG. 11 is a schematic diagram that illustrates another example of the order replacement process of the decomposition information replacement unit according to this embodiment.
Figure 12:
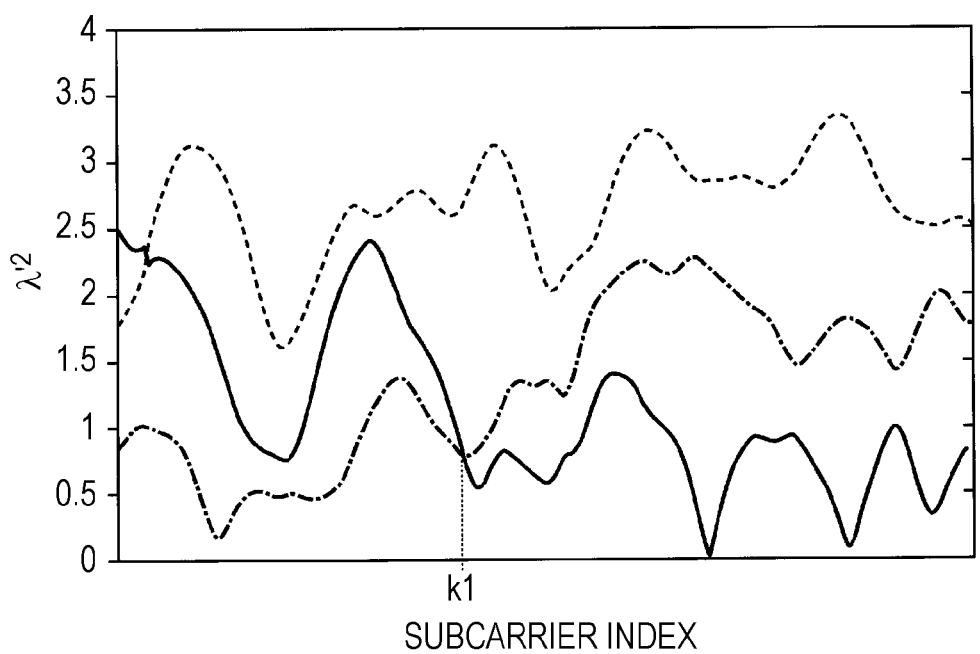
FIG. 12 is another schematic diagram that illustrates another example of the order replacement process of the decomposition information replacement unit according to this embodiment.

FIG. 11 and FIG. 12 are schematic diagrams that illustrate another example of the order replacement process of the decomposition information replacement unit 2122 according to this embodiment. In FIG. 11, the horizontal axis represents the subcarrier number k, and the vertical axis represents the eigenvalue $\lambda_{k,i}^2$. In FIG. 12, the horizontal axis represents the subcarrier number k, and the vertical axis represents the eigenvalue $\lambda'_{k,i}^2$. FIG. 11 and FIG. 12 illustrate a case where the number Nr of the antennas of the terminal device 2=3 and three singular values are present.

In FIG. 11, the broken line represents the first eigenvalue $\lambda_{k,1}^2$, the solid line represents the second eigenvalue $\lambda_{k,2}^2$, and the chain line represents the third eigenvalue $\lambda_{k,3}^2$. In FIG. 11, the second eigenvalue $\lambda_{k,2}^2$ is in proximity to the third eigenvalue $\lambda_{k,3}^2$ in the subcarrier k1. Further, the changes in values of the second eigenvalue $\lambda_{k,2}^2$ and the third eigenvalue $\lambda_{k,3}^2$ become large in a part in which the second eigenvalue $\lambda_{k,2}^2$ is in proximity to the third eigenvalue $\lambda_{k,3}^2$. For example, in the subcarrier k1, the respective difference values (differential values) of the second eigenvalue $\lambda_{k,2}^2$ and the third eigenvalue $\lambda_{k,3}^2$ are large values.

FIG. 12 illustrates the eigenvalue $\lambda'_{k,i}^2$ that is generated by the decomposition information replacement unit 2122. In FIG. 12, the broken line represents the first eigenvalue $\lambda_{k,1}^2$, the solid line represents the second eigenvalue $\lambda_{k,2}^2$, and the chain line represents the third eigenvalue $\lambda_{k,3}^2$. That is, in FIG. 12, when compared to FIG. 11, the decomposition information replacement unit 2122 replaces the second singular value $\lambda_{k,2}$ by the third singular value $\lambda_{k,3}$ in the subcarrier k+1 to Nc and thereby replaces the second eigenvalue $\lambda_{k,2}^2$ by the third eigenvalue $\lambda_{k,3}^2$. The respective changes in values of the second eigenvalue $\lambda'_{k,2}^2$ and the third eigenvalue $\lambda'_{k,3}^2$ of FIG. 12 become small compared to the second eigenvalue $\lambda_{k,2}^2$ and the third eigenvalue $\lambda_{k,3}^2$ of FIG. 11, as the whole or in a part in the vicinity of the subcarrier k1. For example, in the subcarrier k1, the respective difference values (differential values) of the second eigenvalue $\lambda'_{k,2}^2$ and the third eigenvalue $\lambda'_{k,3}^2$ are small values.

Similarly, in a case where four or more singular values or eigenvalues are calculated, the decomposition information replacement unit 2122 may replace the eigenvalues and may generate a combination of the singular values or eigenvalues, which provides small changes with respect to the subcarrier.

The magnitude of the singular value $\lambda'_{k,i}$ is a value that influences the signal-to-noise (SN) ratio. As described later, the terminal device 2 notifies the base station device 1 of the singular value $\lambda'_{k,i}$ sequentially from the first singular value $\lambda'_{k,i}$ (in the ascending order of i). Accordingly, in order to provide a notification of the singular value $\lambda'_{k,i}$ with a large value, the decomposition information replacement unit 2122 may perform arrangement in the order (also referred to as second order) in which the singular value $\lambda'_{k,i}$ increases with respect to i (also referred to as a second order process). In other words, the singular value $\lambda'_{k,i}$ may be said as an increasing function of i.

Specifically, the decomposition information replacement unit 2122 may replace the orders with respect to i for the combinations of singular values (vectors $\Lambda'_i$) in all subcarriers. The decomposition information replacement unit 2122 sets the magnitude of $A_i$ of following formula (7) (the average value of the subcarrier of the singular value) as the magnitude of the singular value, for example. However, the present invention is not limited to this. The decomposition information replacement unit 2122 may set the magnitude of $A'_i$ of following formula (7) as the magnitude of the singular value or may set the maximum value of $\lambda'_{k,i}$ with respect to the subcarrier k as $A_i$.

[Expression 6]

$$A_i = \frac{\sum_{k=1}^{N_c} \lambda'_{k,i}}{N_c} \tag{7}$$

$$A'_i = \frac{\sqrt{\sum_{k=1}^{N_c} (\lambda'_{k,i})^2}}{N_c} \tag{8}$$

In a case of $A_{i2} > A_{i3}$ (i2>i3), the decomposition information replacement unit 2122 replaces the i2th row by the i3th row of an identity matrix I with respect to all the subcarriers k and thereby generates a matrix E. In this case, the decomposition information replacement unit 2122 multiplies a matrix $E_k D_k$ by the generated matrix E from the left and thereby generates a matrix $D'_k$ ($=E \cdot E_k D_k E_k \cdot E$) with respect to all the subcarriers k.

A description will be made below about a case where the decomposition information replacement unit 2122 performs the combining process and the second order process after the order replacement process.

The decomposition information replacement unit 2122 also replaces elements for the matrix $V_k$ (formula (2)) by using the matrix Ek stored in the storage unit and thereby generates a matrix $V'k$ ($=V_k E_k \cdot E$). For example, the respective column vectors of matrices $V'_k$ to $V'_{N_c}$ are matrices $V_k$ to $V_{N_c}$ in which the ith elements are replaced by the jth elements in the respective column vectors. The decomposition information replacement unit 2122 outputs information that indicates the diagonal matrix $\Sigma'_k$ and the matrix $V'_k$, which are generated with respect to all the subcarriers k=1 to Nc, to the conversion processing unit 2123.

The conversion processing unit 2123 performs a process for compressing an information amount based on the information that is input from the decomposition information replacement unit 2122, that is, the information that indicates the diagonal matrix $\Sigma'_k$ and the matrix $V'_k$. For example, the conversion processing unit 2123 may perform the IFFT (frequency-time conversion) or inverse discrete cosine transform (IDCT) for each of the singular value (the diagonal component of the diagonal matrix $\Sigma'_k$) and the right singular vector (the column vector of the matrix $V'_k$). Further, the conversion processing unit 2123 may use the IDCT in a case where the singular values at both ends of the subcarrier k, that is, $\lambda'_{1,i}$ and $\lambda'_{N_c,i}$ are larger than predetermined threshold values (in a case where periodicity is lost).

A description will be made below, as one example, about a case where the conversion processing unit 2123 performs the IFFT for each of the singular value and the right singular vector.

The conversion processing unit 2123 generates the vector $\Lambda'_i = (\lambda'_{1,i}, \lambda'_{2,i}, \ldots, \lambda'_{N_c,i})^t$ in which the singular value $\lambda'_{k,i}$ of the ith row and the ith column of $\Sigma'_k$ is set as the kth element. A superscript t represents transpose of the vector. Information that indicates the vector $\Lambda'_i$ will also be referred to as first replacement information. The conversion processing unit 2123 sets the element of the mth row and the ith column of the matrix $V'_k$ as $y'_{m,i,k}$ and generates a vector $Y'_{m,i} = (y'_{m,i,1}, y'_{m,i,2}, \ldots, y'_{m,i,N_c})^t$ in which $y'_{m,i,k}$ is set as the kth element. The vector $Y'_{m,i}$ will also be referred to as second replacement information.

The conversion processing unit 2123 performs conversions that are expressed in following formulas (9) and (10), for example, for the generated vectors $\Lambda'_i$ and $Y'_{m,i}$ and thereby generates $\sigma'_i$ and $v'_{m,i}$.

[Expression 7]

$$\sigma'_i = F^{-1} \Lambda'_i \tag{9}$$

$$v'_{m,i} = F^{-1} Y'_{m,i} \tag{10}$$

Information that indicates $\sigma'_i$ will be referred to as first conversion information, and information that indicates $v'_{m,i}$ will be referred to as second conversion information. In formulas (9) and (10), $F^{-1}$ represents the IFFT of Nc points and is expressed by following formula (11), for example.

[Expression 8]

$$F^{-1} = \begin{pmatrix} X^0 & X^0 & X^0 & \ldots & X^0 \\ X^0 & X^{-1} & X^{-2} & \ldots & X^{-(N_c-1)} \\ X^0 & X^{-2} & X^{-4} & \ldots & X^{-2(N_c-1)} \\ \vdots & \vdots & \vdots & \ddots & \vdots \\ X^0 & X^{-(N_c-1)} & X^{-2(N_c-1)} & \ldots & X^{-(N_c-1)2} \end{pmatrix} \tag{11}$$

Further, X is a coefficient that is referred to as twiddle factor and is expressed by following formula (12).

[Expression 9]

$$X = \exp\left(-j\frac{2\pi}{N_c}\right) \tag{12}$$

Here, π represents the ratio of a circumference of a circle to its diameter, j represents the imaginary unit, and exp(x) is Napier's constant to the xth power. Note that the IFFT is a scheme for reducing the calculation amount of the IDFT.

The conversion processing unit 2123 generates the feedback information to be notified to the base station device 1 based on the information that indicates the generated $\sigma'_i$ and $v'_{m,i}$. The information that indicates $\sigma'_i$ and $v'_{m,i}$ may be $\sigma'_i$ and $v'_{m,i}$ themselves, may be information that indicates real parts and imaginary parts thereof, or may be information that indicates amplitudes and phases thereof. For example, the conversion processing unit 2123 performs any of or a combination of the following information generation processes.

(1) Information Generation Process 1

For example, the conversion processing unit 2123 sets the value to "0" for the information in which the value or the absolute value of the value is smaller than a predetermined threshold value in the information that indicates $\sigma'_i$ and $v'_{m,i}$. The conversion processing unit 2123 generates the information resulting from the process as the feedback information (the information generation process 1). Further, in the communication system, in a case where the value is "0", the number of bits may be decreased, or the bits may be deleted. Accordingly, the communication system may compress the information amount of the feedback information. Further, there may be a case where the above-described order replacement process, combining process, or conversions expressed by formulas (9) and (10) enables the communication system to suppress expansion of $\sigma'_i$ or $v'_{m,i}$ in the time domain, that is, a case where the expansion of the singular values with respect to time may be suppressed (may be narrowed) in the time domain even in a case where expansion of the singular values occurs to the subcarrier. Accordingly, parts that become "0" with respect to $\sigma'_i$ and $v'_{m,i}$ may be increased, and the communication system may thereby compress the information amount of the feedback information.

(2) Information Generation Process 2

For example, the conversion processing unit 2123 selects values in partial points in the information that indicates $\sigma'_i$ and $v'_{m,i}$. The conversion processing unit 2123 generates the information that includes the selected values as the feedback information (the information generation process 2). In other words, the conversion processing unit 2123 does not include the values that are not selected in the feedback information.

For example, the conversion processing unit 2123 selects values of the number of continuous or discontinuous points from $\sigma'_i$ and $v'_{m,i}$. Here, the conversion processing unit 2123 may select the points based on information that is in advance stored, information notified from the base station device 1, information obtained when synchronization is performed, or information that indicates the points to be selected (a start point, an end point, and the number of points). For example, the conversion processing unit 2123 may select the points based on identification information of the terminal device, the identification information of the base station device, or the identification information of a cell. Further, the conversion processing unit 2123 may select the points from the heads (the first elements) of formulas (9) and (10) and may select the points from the ends (the Ncth elements) in the opposite order. Further, the conversion processing unit 2123 may select the points from predetermined points, may select the points with large values, or may select such points and points in the vicinity of the points.

Specifically, the conversion processing unit 2123 may select Np points sequentially from the points with larger values and may use information that indicates the selected points (for example, the start point, the end point, and the number of points) and information that indicates $\sigma'_i$ and $v'_{m,i}$ at those points as the feedback information. The conversion processing unit 2123 may select the same number of points as the number of points of a GI length $N_{GI}$.

Further, the conversion processing unit 2123 may select the points based on the reception quality (for example, the channel state information) and may select many points in a case where the reception quality is high, compared to a case where the reception quality is low, for example. Further, the conversion processing unit 2123 may decide the points to select for each of component carriers (CC; also referred to as cell).

(3) Information Generation Process 3

The conversion processing unit 2123 decides the number s of the singular values (also referred to as singular value number) to be notified, with respect to i, and selects information that indicates $\sigma'_i$ and $v'_{m,i}$ with respect to the decided i. The conversion processing unit 2123 generates the selected information as the feedback information (the information generation process 3). In other words, the conversion processing unit 2123 does not include the values that are not selected in the feedback information.

For example, the conversion processing unit 2123 decides a notified singular value number s. The notified singular value number s may be the same as Nt, Nr, the number of data streams (the number of codewords or the number of transmission streams) Ns, or the number of layers L. Further, the notified singular value number s may be transmitted from the base station device 1 or may be configured by the terminal device 2 based on information that is transmitted from the base station device 1. Further, the base station device 1 or the terminal device 2 may configure the notified singular value number s based on the reception quality, the number of connection of the terminal device 2, calculation results of the singular value $\lambda_{k,i}$, or capability information of the terminal device 2 (UE capability). Further, the base station device 1 or the terminal device 2 may configure the notified singular value number s based on presence or absence of carrier aggregation, the number of cells that are used for the carrier aggregation (the number of component carriers), and frequency bands. Further, the base station device 1 or the terminal device 2 may configure the notified singular value number s in accordance with kinds of channels that are used for notification, for example, either one of a control channel or a shared channel. As one example, the base station device 1 or the terminal device 2 may have a smaller notified singular value number s in a case of performing the notification by the control channel than the notified singular value number s in a case of performing the notification by the shared channel.

The conversion processing unit 2123 outputs s pieces of information that indicates $\sigma'_1$ to $\sigma'_s$ and $v'_{m,1}$ to $v'_{m,s}$ as the feedback information. Further, the conversion processing unit 2123 may decide the notified singular value number s before the IFFT. In this case, the conversion processing unit 2123 may select the first singular value $\lambda'_{k,1}$ to the sth singular value $\lambda'_{k,s}$ and the vectors $\Lambda'_1$ to $\Lambda'_s$ and may perform the IFFT for the selected singular values and vectors. Accordingly, the conversion processing unit 2123 does not perform the IFFT for the number subsequent to i=s and may thus reduce the load for processes for those.

For example, in a case where s=1 is set because the number of the data streams is 1, the conversion processing unit 2123 outputs the information that indicates $\sigma'_1$ and $v'_{m,1}$ as the feedback information.

(4) Information Generation Process 4

The conversion processing unit 2123 may perform a compression process before performing the IFFT, that is, for $\Lambda'_i$ and $Y'_{m,i}$. For example, the conversion processing unit 2123 performs the compression process for $\Lambda'_i$ and $Y'_{m,i}$ by using a Givens rotation. Subsequently, the conversion processing unit 2123 performs the IFFT for the information for which the compression process is performed. The conversion processing unit 2123 generates the information resulting from the IFFT as the feedback information (the information generation process 4).

(5) Information Generation Process 5

The conversion processing unit 2123 may generate plural candidates of the feedback information and use the candidate that is selected from the generated candidates as the feedback information. For example, the conversion processing unit 2123 may generate the vectors $\Lambda_i$, $\Lambda'_i$ and $Y_{m,i}$, $Y'_{m,i}$ for each of cases where the order replacement process is performed, where the order replacement process is not performed, and where mutually different order replacement processes are performed and may select the feedback information from the pieces of information based on the generated vectors.

Specifically, the decomposition information replacement unit 2122 outputs the information that indicates a diagonal matrix $\Sigma_k$ and the matrix $V_k$ to the conversion processing unit 2123. The conversion processing unit 2123 generates the vectors $\Lambda_i$ and $Y_{m,i}$ based on the information that is input from the decomposition information replacement unit 2122. The conversion processing unit 2123 performs conversions that are expressed in following formulas (13) and (14), for example, for the vectors $\Lambda_i$ and $Y_{m,i}$ and thereby generates $\sigma_i$ and $v_{m,i}$.

[Expression 10]

$$\sigma_i = F^{-1} \Lambda_i \tag{13}$$

$$v_{m,i} = F^{-1} Y_{m,i} \tag{14}$$

Information that indicates $\sigma_i$ will be referred to as third conversion information, and information that indicates $v_{m,i}$ will be referred to as fourth conversion information.

The conversion processing unit 2123 generates the candidate (first candidate information) of the feedback information based on the information that indicates the generated $\sigma'_i$ and $v'_{m,i}$ and generates the candidate (second candidate information) of the feedback information based on the information that indicates $\sigma_i$ and $v_{m,i}$. The conversion processing unit 2123 selects and outputs the candidate information with the least error between the generated first candidate information and second candidate information as the feedback information (the information generation process 5). The conversion processing unit 2123 may select and output the candidate information with a less information amount between the generated first candidate information and second candidate information as the feedback information.

A description will be made below about one example of a case where the information generation process 5 performs the information generation process 2 and the information generation process 5.

The conversion processing unit 2123 selects $N_{GI}$ points from the heads of $\sigma'_i$ and $\sigma_i$ and extracts $\sigma'_i$ and $\sigma_i$ at the selected points. Information that indicates the extracted $\sigma'_i$ will be referred to as first compression information, and information that indicates the extracted $\sigma_i$ will be referred to as third compression information. The conversion processing unit 2123 performs the FFT for the first compression information to generate the vector $\Lambda c_i$ and performs the FFT for the third compression information to generate the vector $\Lambda c'_i$. The conversion processing unit 2123 sets the difference between the vectors $\Lambda c_i$ and $\Lambda_i$ as an error of the first compression information and sets the difference between the vectors $\Lambda c'_i$ and $\Lambda'_i$ as an error of the third compression information.

The conversion processing unit 2123 selects the compression information with a less error between the first compression information and the third compression information and outputs the selected compression information as the feedback information. The conversion processing unit 2123 may set the difference in a specific subcarrier element as the error or may set the average of the differences in plural subcarrier elements as the error. Further, the conversion processing unit 2123 may generate second compression information $vc'_{m,i}$ and fourth compression information $vc_{m,i}$ based on $v'_{m,i}$ and $v_{m,i}$ set the difference between the vectors $v'_{m,i}$ and $vc'_{m,i}$ as an error of the third compression information, and set the difference between vectors $v_{m,i}$ and $vc_{m,i}$ as an error of the fourth compression information.

As described above, the feedback information generation unit 212 may improve the compression efficiency of the amount of the feedback information that is notified to the base station device 1 by the terminal device 2. Accordingly, the communication system may suppress the overhead related to the feedback.

<Feedback Information Acquisition Unit 112>

The feedback information acquisition unit 112 acquires the feedback information that is generated by the feedback information generation unit 212 and generates the channel-related information based on the acquired feedback information. Specifically, the feedback information acquisition unit 112 extracts the information that indicates $\sigma'_i$ and $v'_{m,i}$ (or the information that indicates $\sigma_i$ and $v_{m,i}$; the same applies hereinafter) from the feedback information. The information that indicates $\sigma'_i$ and $v'_{m,i}$ may be the first compression information and the third compression information (or the second compression information or the fourth compression information) or may be the first conversion information and the third conversion information (or the second conversion information or the fourth conversion information). The feedback information acquisition unit 112 performs the FFT for $\sigma'_i$ and $v'_{m,i}$ that are indicated by the extracted information and thereby generates vectors $\Lambda''_i$ and $Y''_{m,i}$ that are expressed in following formulas (15) and (16).

[Expression 11]

$$\Lambda''_i = F\sigma'_i (\text{or } F\sigma_i) \tag{15}$$

$$Y''_{m,i} = Fv'_{m,i} (\text{or } Fv_{m,i}) \tag{16}$$

Here, F represents the FFT (time-frequency transform) of Nc points and is expressed by the inverse matrix of F in formula (11), for example. In a case where the conversion processing unit 2123 performs the IDCT, the feedback information acquisition unit 112 performs discrete cosine transform (DCT) as F.

The feedback information acquisition unit 112 outputs the generated vectors $\Lambda''_i$ and $Y''_{m,i}$ to the precoding unit 105 as the channel-related information. Further, the feedback information acquisition unit 112 may acquire the number of layers L that is decided by the base station device 1 or the terminal device 2 based on the feedback information and may output the acquired number of layers L to the layer mapping unit 104. Further, the feedback information acquisition unit 112 (or a higher layer) may configure the modulation scheme and a coding scheme (modulation and coding scheme (MCS)) or may configure the mapping information based on the generated vector $\Lambda''_i$. Accordingly, the communication system may perform adaptive modulation.

<Precoding Unit 105>

The precoding unit 105 generates the precoding matrix $W'_{t,k}$ by using the vector $Y''_{m,i}$ that is input from the feedback information acquisition unit 112. For example, in a case where s=1 is set because the number of data streams is 1, the precoding unit 105 sets the kth element of the $Y''_{m,i}$ as the element of the mth row and the first column of the matrix $W'_{t,k}$ and thereby generates the matrix $W'_{t,k}$. The precoding unit 105 multiplies the signal that is input from the layer mapping unit 104 by the generated matrix $W'_{t,k}$. The precoding unit 105 may perform a process such as normalization of transmit power together.

In the above configuration, a signal $s_k$ of the subcarrier k among signals that are transmitted from the base station device 1 is expressed by following formula (17).

[Expression 12]

$$s_k = W'_{t,k} d_k \quad (17)$$

Here, $d_k$ represents a signal that is arranged to the subcarrier k among the signals that are input from the layer mapping unit 104 to the precoding unit 105. The signal sk is received by the terminal device 2, and a signal $r_k$ of the subcarrier k among the signals that are demultiplexed by the de-mapping unit 202-m (above "other signals") is expressed by following formula (18).

[Expression 13]

$$r_k = H W'_{t,k} d_k + n_k \quad (18)$$

Here, $n_k$ represents the kth element of a complex noise vector in which each element has a Gaussian variable with an average of zero and a variance of $\square 2$.

The filter unit 203 performs the FFT for $v'_{m,i}$ that is set as the feedback information by the conversion processing unit 2123 (see formula (16)) and thereby generates the vector $Y''_{m,i}$. The filter unit 203 generates the precoding matrix $W'_{t,k}$ by using the generated vector $Y''_{m,i}$. Further, the filter unit 203 generates a receive filter $W'_{r,k}$ by using following formula (19) based on the generated matrix $W'_{t,k}$ and the channel matrix Hk that is generated by the channel estimation unit 211.

[Expression 14]

$$W'_{r,k} = W'_{t,k}{}^H H_k{}^H \quad (19)$$

The filter unit 203 multiplies the signal $r_k$ by the receive filter $W'_{r,k}$. A signal $W'_{r,k} r_k$ resulting from the multiplication is expressed by following formula (20) in a case where s=1 is set because the number of data streams is 1 and L=1 is set, for example.

[Expression 15]

$$W'_{r,k} r_k = W'_{t,k}{}^H H_k{}^H H_k W'_{t,k} d_k + W'_{t,k}{}^H H_k{}^H n_k = \lambda'_{k,1}{}^2 d_k + W'_{t,k}{}^H H_k{}^H n_k \quad (20)$$

Formula (20) indicates that the SN ratio corresponds to the first eigenvalue $\lambda'_{k,1}{}^2$ (maximum eigenvalue) in a case of the MRC. The filter unit 203 divides the signal $W'_{r,k} r_k$ by $\lambda'_{k,1}{}^2$, thereby extracts a signal $d_k$ (di in formula (20)), and outputs the signal $d_k$ to the layer de-mapping unit 204.

As described above, in this embodiment, the terminal device 2 performs the MIMO transmission with the base station device.

The channel estimation unit 211 estimates the channel state information between the terminal device 2 and the base station device 1 and generates the channel matrix $H_k$. The decomposition processing unit 2121 performs the singular value decomposition for the channel matrix Hk and thereby acquires the information that indicates $\Lambda_i$ which includes plural singular values $\lambda_{k,i}$ and the information that indicates the matrix Vk which includes the right singular vectors respectively associated with the plural singular values $\lambda_{k,i}$. The decomposition information replacement unit 2122 mutually replaces portions of the plural singular values $\lambda_{k,i}$ in $\Lambda_i$, thereby acquires the information that indicates the $\Lambda'_i$, and further acquires the information that indicates $Y'_{m,i}$ based on $\Lambda'_i$ and the matrix $V'_k$. The conversion processing unit 2123 performs the conversion process for $Y'_{m,i}$ and thereby acquires the information that indicates $v'_{m,i}$. The radio transmission unit 213 notifies the base station device 1 of the information that indicates $v'_{m,i}$.

Accordingly, in the communication system, the terminal device 2 may perform appropriate feedback to the base station device 1 in MIMO transmission. For example, the communication system may reduce the information amount of the feedback information by the order replacement process. Further, the communication system 2 may feed back accurate channel state information compared to a case where the order replacement process is not performed.

The information that is converted to the time domain by the IFFT by the conversion processing unit 2123 is not the channel state information itself but the information that results from the singular value decomposition performed by the decomposition processing unit 2121. For example, this information is obtained by multiplying the channel state information by the unitary matrix from the left and right, is the singular values that appear as the components of the diagonal matrix, and is the right singular vectors that correspond to the singular values. Because the multiplied unitary matrix is a matrix decided based on the channel state information, a time domain signal of the singular value does not represent a value that corresponds to a delay wave component. The multiplication between the unitary matrix and the channel state information in the frequency domain means convolution in the time domain, and the convolution provides a time expanse to the components of the delay wave. Having the time expanse means that the efficiency of the above compression degrades. In this embodiment, in order to improve the compression efficiency of the channel state information that is estimated by the terminal device 2, portions of the results of the singular value decomposition performed by the decomposition processing unit 2121 are replaced (or inverted). That is, the communication system may suppress the expanse in the time domain and improve the frequency efficiency by the replacement.

The conversion processing unit 2123 performs the conversion process for $\Lambda'_i$ and thereby acquires the information that indicates $\sigma'_i$. The radio transmission unit 213 notifies the base station device 1 of the information that indicates $\sigma'_i$. Accordingly, in the communication system, the terminal device 2 may appropriately feed back the information that indicates the singular value to the base station device.

In a case where the difference between two singular values $\lambda_{k1,i}$ included in $\Lambda_i$ is smaller than the preset threshold value $\lambda_{th}$, the decomposition information replacement unit 2122 replaces at least the two singular values $\lambda_{k1,i}$ and thereby acquires the information that indicates $\Lambda'_i$. Accordingly, the communication system may appropriately replace at least two singular values $\lambda_{k1,i}$. For example, the communication system may reduce the change in the slope of the eigenvalue $\lambda'_{k,i}{}^2$ (or the singular value $\lambda_{k1,i}$) with respect to k after the replacement.

The conversion processing unit 2123 performs the conversion process for $\Lambda_i$ thereby acquires the information that indicates $\sigma_i$, performs the conversion process for $Y_{m,i}$, and thereby acquires the information that indicates $v_{m,i}$. The conversion processing unit 2123 uses the pair of information that indicates $\sigma'_i$ and information that indicates $\sigma'_i$ and the pair of the information that indicates $v_{m,i}$ and information that indicates $\sigma_i$, thereby compares the errors, and selects the pair with a less error. The radio transmission unit 213 notifies the base station device 1 of the information selected by the conversion processing unit 2123 as the feedback information. Accordingly, in the communication system, the terminal device 2 may appropriately feed back the information with a small error to the base station device.

Further, in this embodiment, the channel estimation unit 211 estimates the channel state information between the base station device 1 and the terminal device 2 that perform the MIMO transmission and for each of the subcarriers. The radio transmission unit 213 notifies the base station device 1 of the information based on the channel state information, which is the feedback information that has a first subcarrier element and a second subcarrier element. In this feedback information, with respect to the singular value $\lambda_{k,i}$ based on the channel state information, the singular value $\lambda_{k,i}$ that corresponds to the first subcarrier k (<k1) element and the singular value $\lambda_{k,i}$ that corresponds to the second subcarrier k (≥k1) element are different in the magnitude order of the values in each of the subcarriers. Accordingly, the communication system may flexibly change the order and the combination of the subcarrier elements in the feedback information, and the terminal device 2 may perform appropriate feedback to the base station device 1.

In the above embodiment, the communication system may interpolate the estimated channel state information into the channel state information and may thereby generate the feedback information by using the channel state information resulting from the interpolation. For example, in a case where the reference signal is periodically transmitted in the frequency domain, the terminal device 2 uses the channel state information that is estimated in the subcarrier in which the reference signal is arranged to perform an interpolation process (for example, first-order linear interpolation, linear predictive interpolation, or the like). Accordingly, the terminal device 2 may acquire the channel state information of the subcarrier in which the reference signal is not arranged and may improve the accuracy of the feedback information.

Further, the terminal device 2 may notify a base station device 2 not of the singular value or the right singular vector itself but of an interpolation coefficient that is calculated by the interpolation process as the feedback information to the base station device 1. Further, the terminal device 2 may perform the interpolation process with higher accuracy as the fluctuations in the singular value and the right singular vector are less in a case where the interpolation process is performed. Because the terminal device 2 reduces the fluctuations by the order replacement process or the combining process, as a result, the accuracy of the interpolation process may be enhanced.

The base station device 1 may perform a keeping process such as the first-order linear interpolation or the linear predictive interpolation based on the feedback information that is notified from the terminal device 2. In this case also, because the terminal device 2 performs the order replacement process or the combining process, the base station device 1 may perform the interpolation process with high accuracy.

As described above, in a case where the feedback information that is notified by the terminal device 2 is the interpolation coefficient, the singular value and the right singular vector may be generated by using the interpolation coefficients that may be obtained from formula (15) and formula (16).

Second Embodiment

A second embodiment of the present invention will hereinafter be described in detail with reference to the drawings.

In the first embodiment, a case where the number of data streams Ns is one is targeted with respect to the (downlink) transmission from the base station device 1 to the terminal devices 2. In this embodiment, a case where the number of data streams Ns=min (Nt, Nr) is targeted with respect to transmission from a base station device 1a to terminal devices 2a.

One of the SU-MIMO transmissions in which plural streams are simultaneously transmitted is the eigenmode transmission, for example. In this embodiment, a description will be made about a case where a base station device 2a performs the precoding based on the eigenmode transmission. However, the present invention is not limited to this. The base station device 2a may perform the precoding based on the scheme other than the eigenmode transmission. In this embodiment, the number of layers L=Ns is set. However, the present invention is not limited to this, but the number of layers L may be different from the number of data streams Ns.

<Base Station Device 1a>

Figure 13:
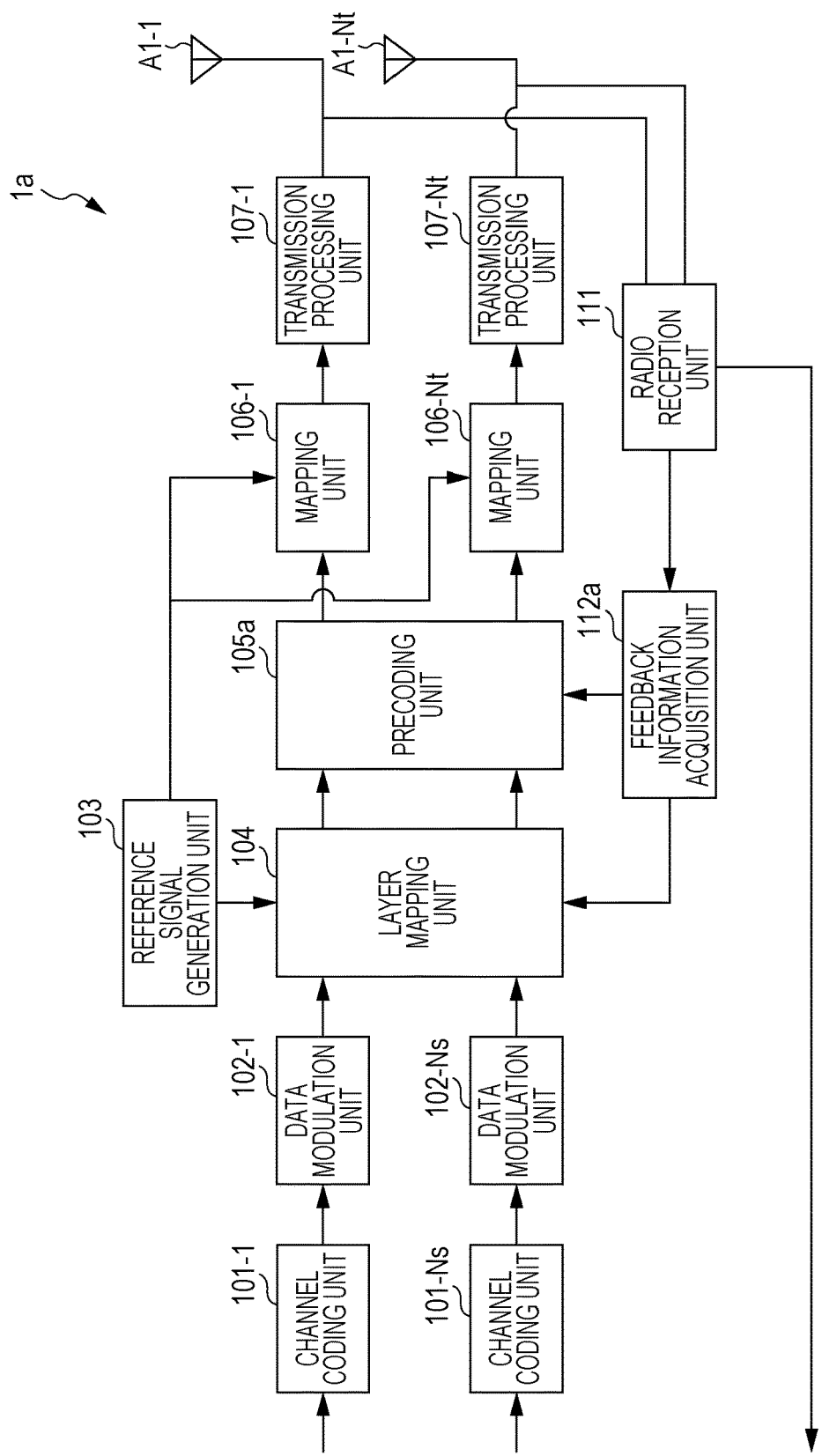
FIG. 13 is a schematic block diagram that illustrates a configuration of a base station device according to a second embodiment of the present invention.

FIG. 13 is a schematic block diagram that illustrates a configuration of the base station device 1a according to the second embodiment of the present invention. In this drawing, the base station device 1a is configured to include Ns channel coding units 101-1 to 101-Ns, Ns data modulation units 102-1 to 102-Ns, the reference signal generation unit 103, the layer mapping unit 104, a precoding unit 105a, the Nt mapping units 106-1 to 106-Nt, the Nt transmission processing units 107-1 to 107-Nt, the Nt antennas A1-1 to A1-Nt, the radio reception unit 111, the precoding unit 105a, and a feedback information acquisition unit 112a.

Comparing the base station device 1a with the base station device 1 (FIG. 3) according to the first embodiment, the channel coding unit 101-ns (ns=1 to Ns), the data modulation unit 102-ns, the precoding unit 105a, and the feedback information acquisition unit 112a are different. However, the other configurations have the same functions as those according to the first embodiment, and a description thereof will thus not be made.

The channel coding unit 101-ns performs the channel coding for the transmission data sequence that is input. The channel coding unit 101-ns outputs the data sequence for which the channel coding is performed to the data modulation unit 102-ns.

The data modulation unit 102-ns performs the modulation for the data sequence that is input from the channel coding unit 101-ns and thereby generates the modulation symbol. The data modulation unit 102-ns outputs the generated modulation symbol to the layer mapping unit 104.

Details of the precoding unit 105a and the feedback information acquisition unit 112a will be described later.

<Terminal Device 2a>

Figure 14:
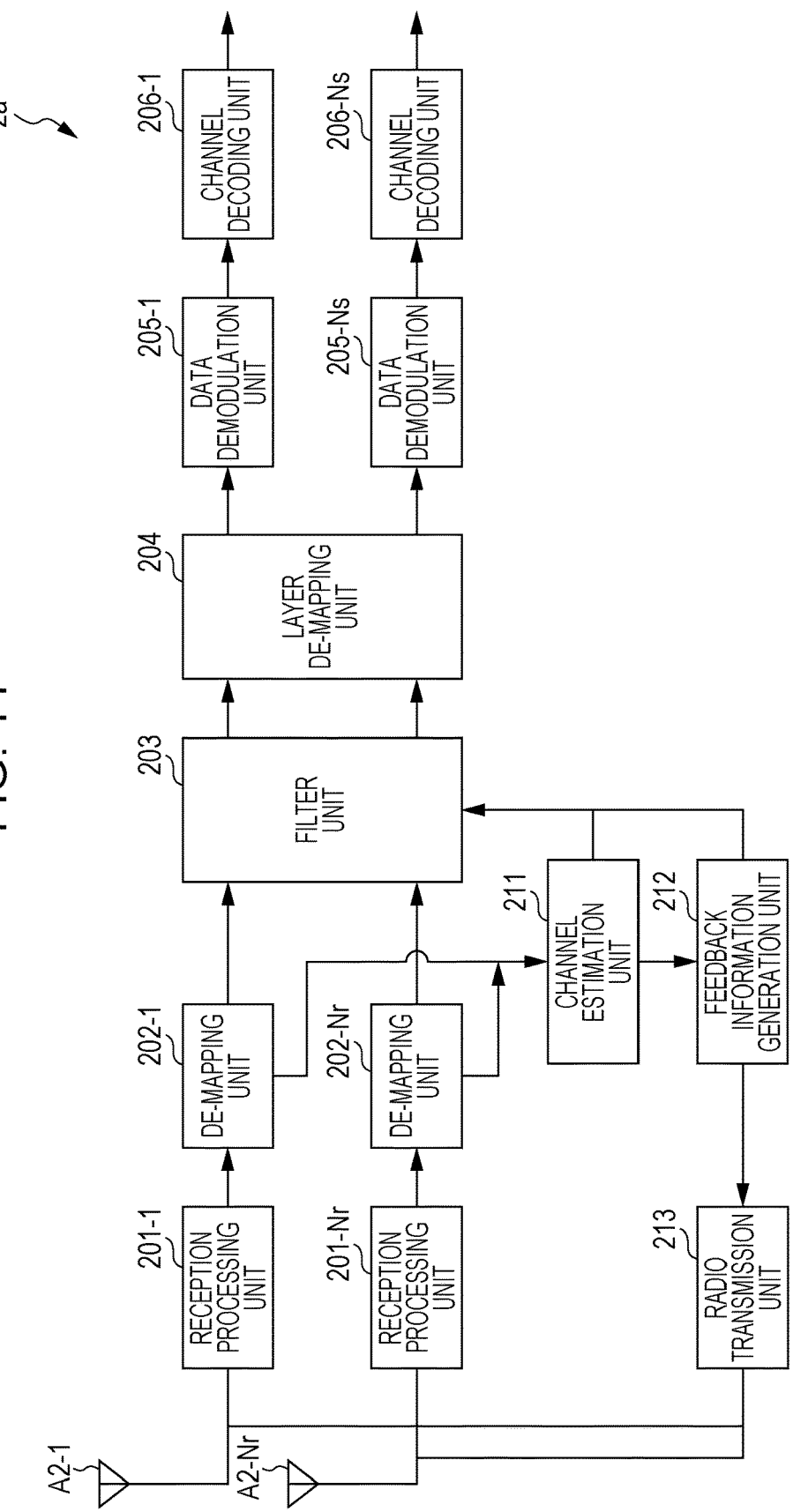
FIG. 14 is a schematic block diagram that illustrates a configuration of a terminal device according to this embodiment.

FIG. 14 is a schematic block diagram that illustrates a configuration of the terminal device 2a according to this embodiment. In this drawing, the terminal device 2a is configured to include Ns antennas A2-1 to A2-Nr, the Nr reception processing units 201-1 to 201-Nr, the Nr de-mapping units 202-1 to 202-Nr, the filter unit 203, the layer de-mapping unit 204, Ns data demodulation units 205-1 to 205-Ns, Ns channel decoding units 206-1 to 206-Ns, the channel estimation unit 211, a feedback information generation unit 212a, and the radio transmission unit 213.

Comparing the terminal device 2a with the terminal device 2 (FIG. 4) according to the first embodiment, the data demodulation unit 205-ns (ns=1 to Ns) and the channel decoding unit 206-ns are different. However, the other configurations have the same functions as those according to the first embodiment, and a description thereof will thus not be made.

The data demodulation unit 205-ns performs the demodulation by the modulation scheme that is used by the data modulation unit 102-ns for the modulation symbol that is input from the layer de-mapping unit 204 and thereby calculates the bit log likelihood ratio. The data demodulation unit 205-ns outputs the calculated bit log likelihood ratio to the channel decoding unit 206-ns.

The channel decoding unit 206-ns performs the decoding process for the data sequence that is input from the data demodulation unit 205-ns in accordance with the channel decoding scheme that is used by the channel coding unit 101-ns. The channel decoding unit 206-ns outputs the data sequence resulting from the decoding process to the MAC layer or the like, which performs the retransmission control or the like.

The feedback information generation unit 212 sets the number of singular values s as Ns and performs the second order process and the information generation process 3. That is, the feedback information generation unit 212 arranges the singular values $\lambda'_{k,i}$ in the order in which the singular value $\lambda'_{k,i}$ increases with respect to i by the second order process. Further, the feedback information generation unit 212 selects Ns pieces of information that indicates $\sigma'_1$ to $\sigma'_{Ns}$ and $v'_{m,1}$ to $v'_{m,Ns}$ in the ascending order from 1 to s with respect to i in the information generation process 3 and uses the pieces of information as the feedback information. Accordingly, the feedback information generation unit 212 may generates respective pieces of information that indicates $\sigma'_i$ and $v'_{m,i}$ as the feedback information in the order of the largeness of $A_n$ (see formula (7) or (8)).

<Feedback Information Acquisition Unit 112a>

The feedback information acquisition unit 112a has the same function as the feedback information acquisition unit 112. However, the following process is performed in a case where Ns is two or more.

The feedback information acquisition unit 112a extracts the information that indicates $\sigma'_i$ and $v'_{m,i}$ of i=1 to Ns from the feedback information. In a case where the conversion processing unit 2123 performs the above-described information generation process 5, the feedback information acquisition unit 112a extracts the information that indicates $\sigma_i$ and $v_{m,i}$ of i=1 to Ns from the feedback information. In this case, the information that indicates $\sigma_i$ and $v_{m,i}$ is indicated by the information that indicates $\sigma'_i$ and $v'_{m,i}$ in the description made below. The feedback information acquisition unit 112a performs the FFT for $\sigma'_i$ and $v'_{m,i}$ that are indicated by the extracted information and thereby generates the vectors $\Lambda''_i$ and $Y''_{m,i}$ (see formulas (15) and (16)).

<Precoding Unit 105a>

The precoding unit 105a generates the precoding matrix $W'_{t,k}$ by using the vector $Y''_{m,i}$ that is generated by the feedback information acquisition unit 112a. For example, the precoding unit 105a sets the kth element of the $Y''_{m,i}$ as the element of the mth row and the ith column of the matrix $W'_{t,k}$ and thereby generates the matrix $W'_{t,k}$. For example, the matrix $W'_{t,k}$ becomes a matrix with Nt rows and Ns columns. The precoding unit 105a outputs the generated matrix $W'_{t,k}$ to the precoding unit 105 while setting the matrix $W'_{t,k}$ as the channel-related information. The precoding unit 105a sets signals dk, ns of each of Ns layers ns as the nsth element of a vector $d_k$ and thereby generates the vector $d_k$. The precoding unit 105a multiplies the vector dk by the precoding matrix $W'_{t,k}$ and thereby performs the precoding (see formula (17)).

A signal resulting from the multiplication by the receive filter $W'_{r,k}$ by the filter unit 203 is expressed by following formula (21).

[Expression 16]

$$W'_{r,k}r_k = W'_{t,k}{}^H H_k{}^H H_k W_{t,k} d_k + W'_{t,k}{}^H H_k{}^H n_k = \Sigma'_k{}^2 d_k + W'_{t,k}{}^H H_k{}^H n_k \quad (21)$$

In formula (21), $\Sigma'_k$ is a diagonal matrix, and $(\Sigma'_k)^2$ is also a diagonal matrix. That is, a transmission data sequence $d_k$ is separated into each data stream (each element of the vector dk) by the precoding matrix $W'_{t,k}$ and the receive filter $W'_{r,k}$. Further, it is understood that the SN ratio of the signal resulting from the multiplication by the receive filter $W'_{r,k}$ corresponds to the eigenvalue $\lambda'_{k,i}{}^2$ in the ith data stream (the ith element of the vector $d_k$).

As described above, in this embodiment, in the communication system, the terminal device 2a may perform appropriate feedback to the base station device 1a in the MIMO transmission even in a case where the number of data streams is two or more.

Third Embodiment

A third embodiment of the present invention will hereinafter be described in detail with reference to the drawings.

In this embodiment, a base station device 1b replaces at least two kth elements of the vector $\Lambda''_i$ (i=1 to Ns). i is identification information of the eigenvalue, identification information of the singular value, identification information of the data stream, identification information of the codeword, or identification information of the layer. A terminal device 2b and the base station device 1b perform the same replacement for each of a vector $Y''_i$ and a vector $Y'_i$. The terminal device 2b and the base station device 1b use the vector $Y''_i$ and vector $Y'_i$ that result from the replacement to respectively generate a precoding matrix $W'_{r,k}$ and the receive filter $W'_{r,k}$. Further, the base station device 1b or the terminal device 2b may decide the MCS for each of the data streams (codewords), for example, based on the vector $\Lambda''_i$ resulting from the replacement.

<Base Station Device 1b>

Figure 15:
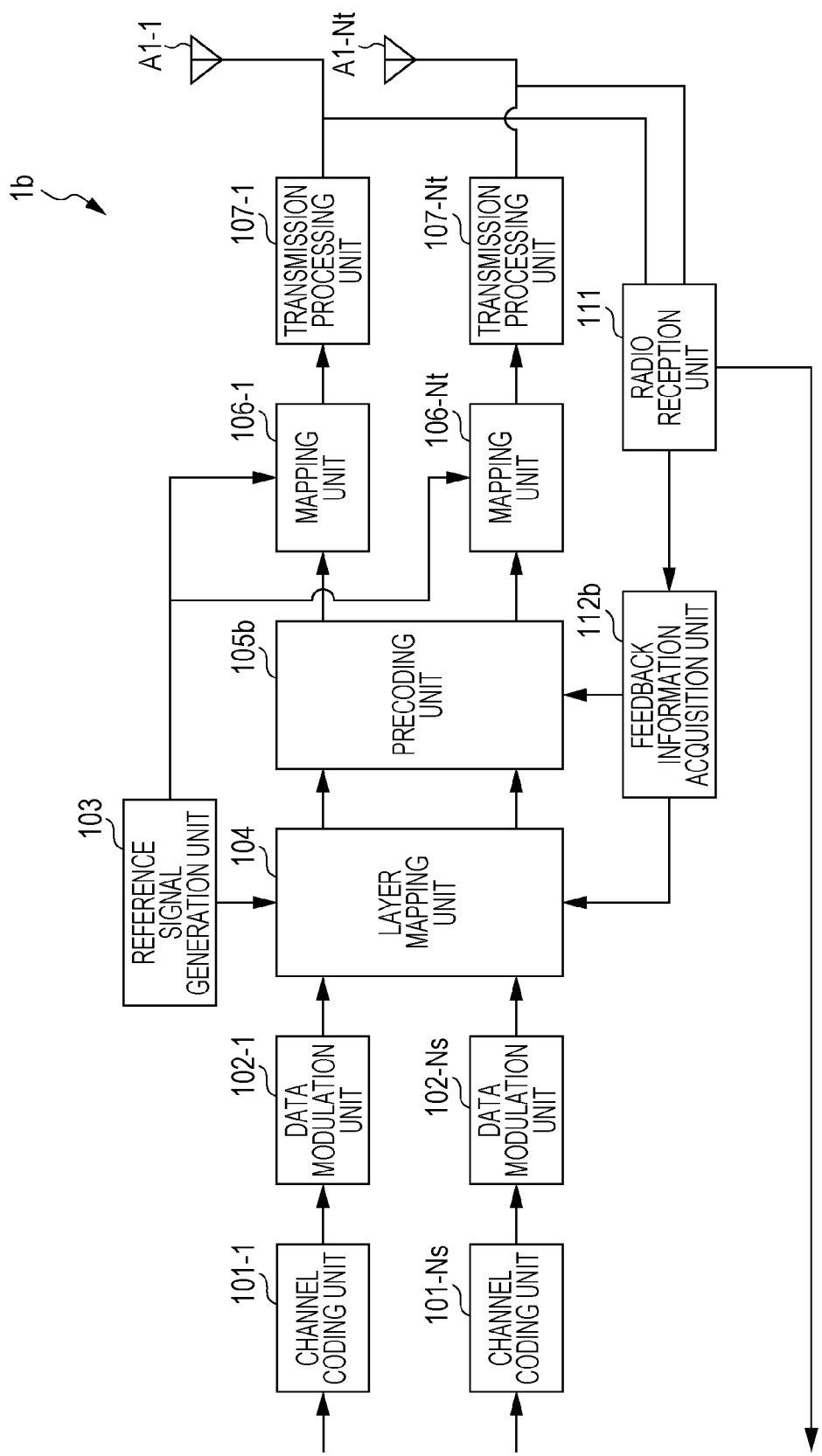
FIG. 15 is a schematic block diagram that illustrates a configuration of the base station device according to the second embodiment of the present invention.

FIG. 15 is a schematic block diagram that illustrates a configuration of the base station device 1b according to the third embodiment of the present invention. In this drawing, the base station device 1b is configured to include the Ns channel coding units 101-1 to 101-Ns, the Ns data modulation units 102-1 to 102-Ns, the reference signal generation unit 103, the layer mapping unit 104, a precoding unit 105b, the Nt mapping units 106-1 to 106-Nt, the Nt transmission processing units 107-1 to 107-Nt, the Nt antennas A1-1 to A1-Nt, the radio reception unit 111, the precoding unit 105b, and the feedback information acquisition unit 112a.

Comparing the base station device 1b with the base station device 1a (FIG. 13) according to the second embodiment, the precoding unit 105b and a feedback information acquisition unit 112b are different. However, the other configurations have the same functions as those according to the second embodiment, and a description thereof will thus not be made.

The feedback information acquisition unit 112b has the same function as the feedback information acquisition unit 112 and generates the vectors $\Lambda''_i$ and $Y''_{m,i}$ (i=1 to Ns) that are expressed in formulas (15) and (16). The feedback information acquisition unit 112 replaces at least two kth elements of the generated vectors $\Lambda''_i$ to $\Lambda''_{Ns}$.

Specifically, the feedback information acquisition unit 112b generates a matrix $\Delta = (\Lambda''_1, \Lambda''_2, \ldots, \Lambda''_{Ns})^t$ in which the vector $\Lambda''_i$ is the ith row. The feedback information acquisition unit 112b sets the column vector of the kth column of $\Delta$ as $\Delta_k$. The feedback information acquisition unit 112b arranges elements (elements of i=1 to Ns) of each $\Delta_k$ in the descending order with respect to i. The order of arranging the elements of this $\Delta_k$ in the descending order will also be referred to as third ordering. The feedback information acquisition unit 112b generates a matrix $\Delta'_k$ in which the ith elements are in the descending order. The column vector $\Delta'_k$ is expressed by following formula (22) by using $E'_k$.

[Expression 17]

$$\Delta'_k = E'_k \Delta_k \quad (22)$$

The matrix $E'_k$ is a permutation matrix and is a matrix for replacement in the descending order about the elements of $\Delta_k$. For example, the matrix $E'_k$ may become the same matrix as a partial matrix of the first row and the first column to the Nsth row and the Nsth column of $(E \cdot E_k)^{-1}$ or as $(E \cdot E_k)^{-1}$.

The feedback information acquisition unit 112b generates a matrix $\Delta' = \Lambda'''_2, \ldots \Lambda'''_{Ns})^t = (\Delta'_1, \Delta'_2, \ldots, \Delta'_{Nc}) = (E'_1 \Delta_1, E'_2 \Delta_2, \ldots, E'_{Nc} \Delta_{Nc})$. Accordingly, the feedback information acquisition unit 112b generates a vector $\Lambda'''_i$.

Similarly, the feedback information acquisition unit 112b generates a matrix $X = (Y''_1, Y''_2, \ldots, Y''_{Ns})^t$ in which the vector $Y''i$ is the ith row. The feedback information acquisition unit 112b sets the column vector of the kth column of $X$ as $X_k$. The feedback information acquisition unit 112b generates a matrix $X' = (Y'''_1, Y'''_2, \ldots, Y'''_{Ns})^t = (X'_1, X'_2, \ldots, X'_{Nc}) = (E'_1 X_1, E'_2 X_2, E'_{Nc} X_{Nc})$. Accordingly, the feedback information acquisition unit 112b generates a vector $Y'''_i$.

The precoding unit 105b generates the precoding matrix $W'_{t,k}$ by using the vector $Y'''_{m,i}$ that is generated by the feedback information acquisition unit 112b. For example, the precoding unit 105b sets the kth element of the $Y'''_{m,i}$ as the element of the mth row and the ith column of the matrix $W'_{t,k}$ and thereby generates the matrix $W'_{t,k}$. The precoding unit 105b outputs the generated matrix $W'_{t,k}$ to the precoding unit 105 while setting the matrix $W'_{t,k}$ as the channel-related information.

Further, the feedback information acquisition unit 112b (or higher layer) may decide the MCS of the ith data stream (codeword), for example, based on the generated vector $\Lambda'''_i$.

<Terminal Device 2b>

Figure 16:
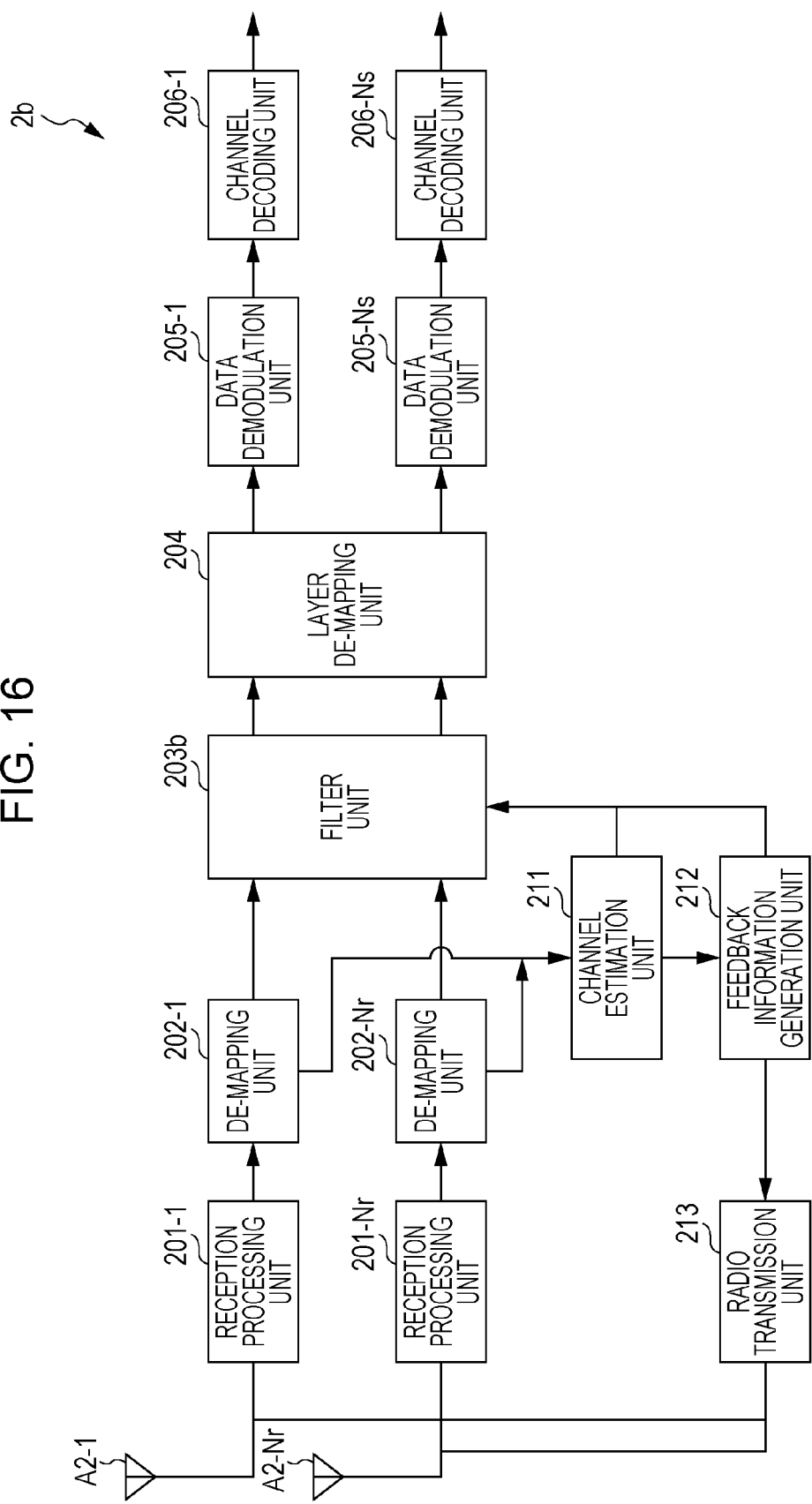
FIG. 16 is a schematic block diagram that illustrates a configuration of a terminal device according to this embodiment.

FIG. 16 is a schematic block diagram that illustrates a configuration of the terminal device 2b according to this embodiment. In this drawing, the terminal device 2b is configured to include the Ns antennas A2-1 to A2-Nr, the Nr reception processing units 201-1 to 201-Nr, the Nr de-mapping units 202-1 to 202-Nr, a filter unit 203b, the layer de-mapping unit 204, the Ns data demodulation units 205-1 to 205-Ns, the Ns channel decoding units 206-1 to 206-Ns, the channel estimation unit 211, a feedback information generation unit 212b, and the radio transmission unit 213.

Comparing the terminal device 2b with the terminal device 2a (FIG. 14) according to the second embodiment, the filter unit 203b is different. However, the other configurations have the same functions as those according to the second embodiment, and a description thereof will thus not be made.

The filter unit 203b performs the FFT for $\sigma'_i$ and $v'_{m,i}$ that are set as the feedback information by the conversion processing unit 2123 (see formulas (15) and (16)) and thereby generates the vectors $\Lambda''_i$ and $Y''_{m,i}$. The filter unit 203b performs the same process as the feedback information acquisition unit 112b for the vectors $\Lambda''_i$ and $Y''_{m,i}$, thereby generates the vectors $\Lambda'''_i$ and $Y'''_i$ and further generates the matrix $W'_{t,k}$. The filter unit 203b generates the receive filter $W'_{r,k}$ based on the generated matrix $W'_{t,k}$ and the channel matrix Hk that is generated by the channel estimation unit 211 (see formula (19)).

The filter unit 203b multiplies the signal $r_k$ by the receive filter $W'_{r,k}$.

In a case where the base station device 1b decides the MCS for each of the codewords, the base station device 1b requests information that is associated with the reception quality of the terminal device 2b (for example, signal to interference plus noise power ratio (SINR)) or a desired MCS by the terminal device 2b. Thus, the terminal device 2b calculates the information associated with the reception quality and notifies the base station device 1b of the information. In this case, the terminal device 2b conducts the calculation of the information associated with the reception quality while assuming that the base station device 1b performs the third ordering.

As described above, in this embodiment, in the communication system, the base station device 1b and the terminal device 2b perform the third ordering. Accordingly, the communication system may improve spectral efficiency of the system. Further, it is possible for the communication system to maximize the channel capacity under the restriction that the MCS has to be decided for each of the codewords, for example.

The base station device 1b and the terminal device 2b may switch between performing the above third ordering or not performing. In this case, either one of the base station device 1b and the terminal device 2b may notify the other of information that indicates whether or not the third ordering is performed. Further, this information may be included in the feedback information. Further, the base station device 1b and the terminal device 2b may perform plural kinds of the third ordering and provide a notification of information that indicates the kinds of the third ordering. Further, this information may be included in the feedback information.

Fourth Embodiment

A fourth embodiment of the present invention will hereinafter be described in detail with reference to the drawings.

In the first embodiment and the second embodiment, descriptions are made about cases where the communication system performs the SU-MIMO. In this embodiment, a description will be made about a case where the communication system performs multi-user MIMO (MU-MIMO). In the MU-MIMO, one base station device is simultaneously connected with plural terminal devices.

Figure 17:
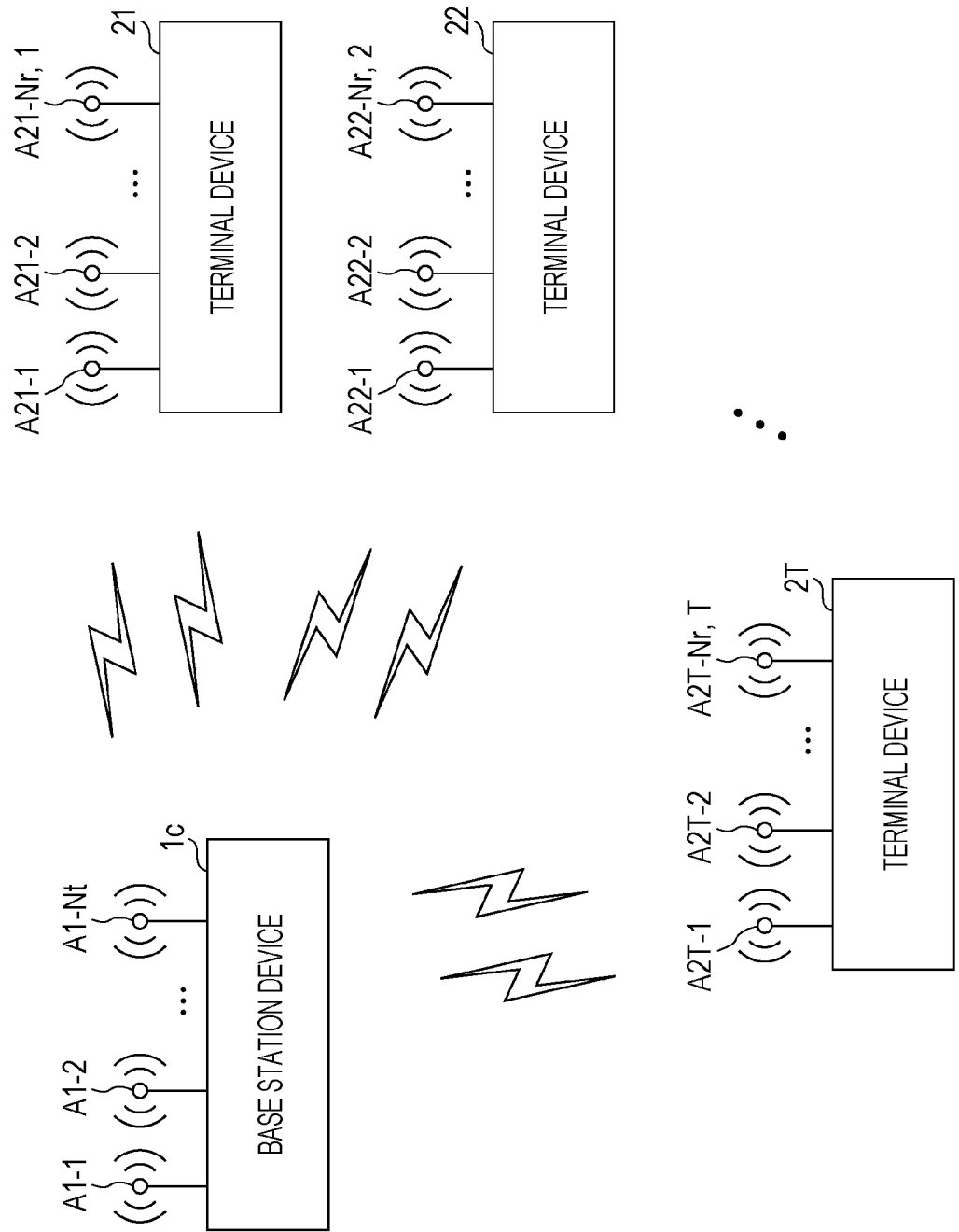
FIG. 17 is a schematic diagram that illustrates a configuration of a communication system according to a fourth embodiment of the present invention.

FIG. 17 is a schematic diagram that illustrates a configuration of a communication system according to the fourth embodiment of the present invention. In this drawing, a base station device 1c includes the Nt antennas A1-1 to A1-Nt, and T terminal devices 2t (t=1 to T) include Nr antennas A2t-1 to A2t-Nr,t. In FIG. 17, the T terminal devices 21 to 2T are connected with one base station device 1c, and data transmission is performed. In transmission from the base station device 1c to the terminal devices 2t (downlink), the number of data streams is set as Ns,t. The number of data streams Ns,t is smaller than the total value Nu of t=1 to T. Further, in this embodiment, a description will be made about a case where the base station device 1c performs the precoding for performing closed-loop type MU-MIMO transmission.

That is, the base station device 1c performs the SVD or the precoding based on the singular value decomposition. However, the present invention is not limited to this. The base station device 1c may perform transmission other than the closed-loop type MU-MIMO transmission.

Each configuration of the terminal device 2t is the same as the terminal device 2 (FIG. 4) according to the first embodiment, the terminal device 2a (FIG. 14) according to the second embodiment, or the terminal device 2b (FIG. 16) according to the third embodiment (however, in each of the drawings, Nr is substituted by Nr,t), and a description thereof will thus not be made. Further, in the description made below, a suffix t will be attached in order to identify each of the terminal devices.

For example, the channel matrix $H_k$ that is generated by the terminal device 2t will be expressed as $H_{k,t}$, the matrices $U_k$, $\Sigma_k$, and $V_k$ (see formula (2)) that result from the singular value decomposition of the channel matrix $H_{k,t}$ will be expressed as $U_{k,t}$, $\Sigma_{k,t}$, and $V_{k,t}$. That is, the relationship of following formula (23) holds between the channel matrix $H_{k,t}$ and the matrices $U_{k,t}$, $\Sigma_{k,t}$, and $V_{k,t}$.

[Expression 18]

$$H_{k,t} = U_{k,t} \Sigma_{k,t} V_{k,t}^H \quad (23)$$

Here, the matrix $U_{k,t}$ is an Nr,t×Nr,t unitary matrix that is formed with the left singular vector, and the matrix $\Sigma k,t$ is an Nr,t×Nt matrix that is formed with a diagonal matrix or the diagonal matrix and a zero matrix. The matrix $V_{k,t}$ is an Nt×Nt unitary matrix that is formed with the right singular vector. Further, the information that indicates $\sigma'_i$ and $v'_{m,i}$ in the feedback information which is fed back by the terminal device 2t will be expressed as $\sigma'_{i,t}$ and $v'_{m,i,t}$. Further, in this embodiment, the number of layers $L_t = N_{s,t}$ is set in communication between the base station device 1c and the terminal device 2t. However, the present invention is not limited to this, but the number of layers $L_t$ may be different from the number of data streams $N_{s,t}$.

<Base Station Device 1c>

Figure 18:
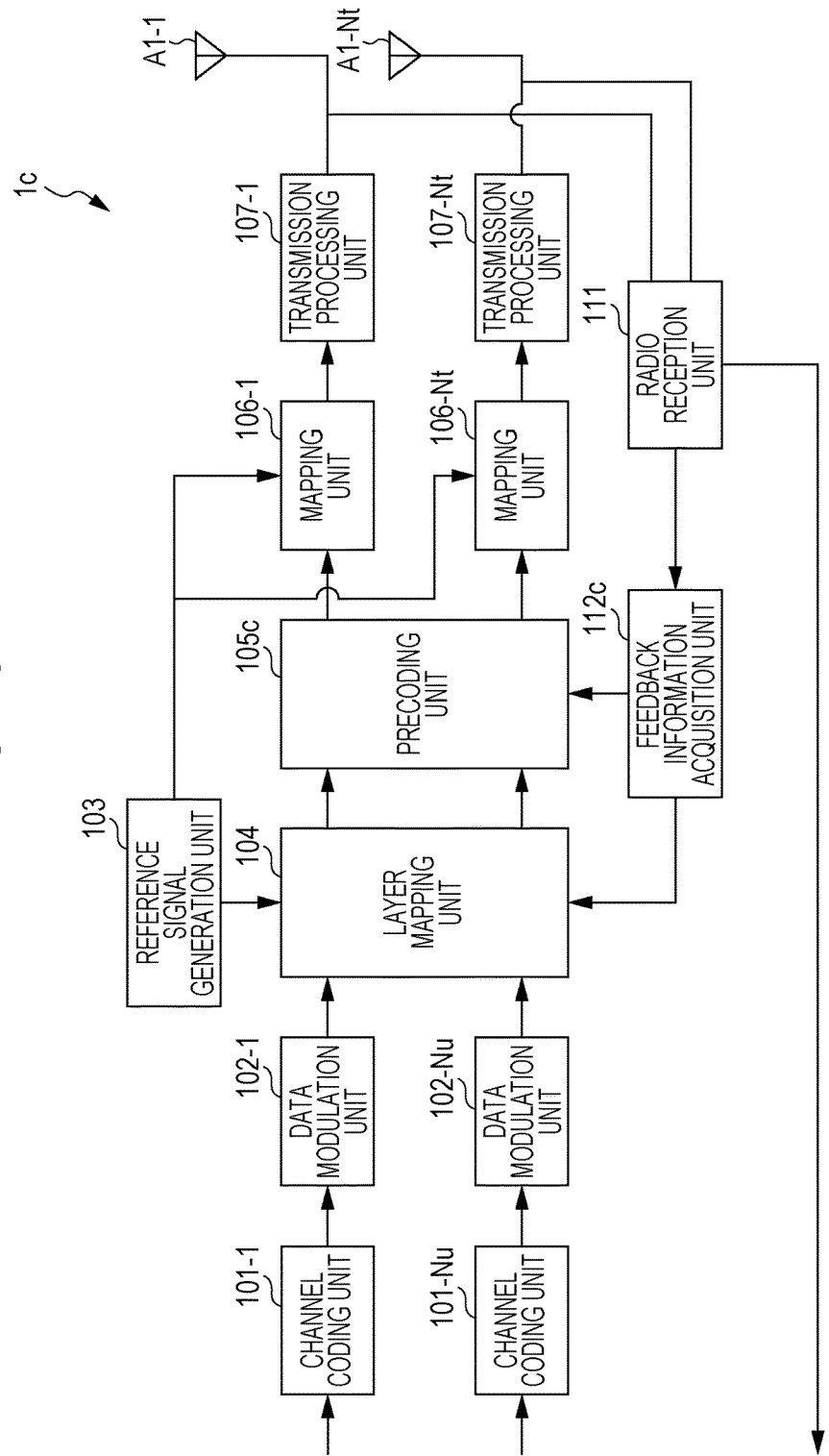
FIG. 18 is a schematic block diagram that illustrates a configuration of a base station device according to this embodiment.

FIG. 18 is a schematic block diagram that illustrates a configuration of the base station device 1c according to this embodiment. In this drawing, the base station device 1a is configured to include Nu channel coding units 101-1 to 101-Nu, Nu data modulation units 102-1 to 102-Nu, the reference signal generation unit 103, the layer mapping unit 104, a precoding unit 105c, the Nt mapping units 106-1 to 106-Nt, the Nt transmission processing units 107-1 to 107-Nt, the Nt antennas A1-1 to A1-Nt, the radio reception unit 111, the precoding unit 105c, and a feedback information acquisition unit 112c.

Comparing the base station device 1c with the base station device 1a (FIG. 13) according to the second embodiment, the precoding unit 105c and the feedback information acquisition unit 112c are different. However, the other configurations have the same functions as those according to the second embodiment, and a description thereof will thus not be made.

Although the numbers of the channel coding unit 101-ns (ns=1 to Nu) and the data modulation unit 102-ns may be different from the case of the second embodiment, the channel coding unit 101-ns and the data modulation unit 102-ns have the same functions as the second embodiment. Further, the layer mapping unit 104 arranges the modulation symbol of the data that are addressed to each of the terminal devices 2t to the layer for the terminal device 2t. For example, the layer mapping unit 104 does not arrange the modulation symbol of the data that are addressed to the other terminal devices 2t1 to the layer for the terminal device 2t2 (t1≠t2).

The feedback information acquisition unit 112c extracts the information that indicates $\sigma'_{i,t}$ and $v'_{m,i,t}$ of i=1 to $N_{s,t}$ (or the information that indicates $\sigma_{i,t}$ and $v_{m,i,t}$) from the feedback information of the terminal device 2t. The feedback information acquisition unit 112c performs the FFT for $\sigma'_{i,t}$ and $v'_{m,i,t}$ that are indicated by the extracted information and thereby generates vectors $\Lambda''_{i,t}$ and $Y''_{m,i,t}$ (see formulas (15) and (16)).

The precoding unit 105c generates a matrix $B_{k,t}$ by using the vector $Y''_{m,i}$ that is generated by the feedback information acquisition unit 112c. For example, the precoding unit 105c sets the kth element of the $Y''_{m,i}$ as the element of the mth row and the ith column of $B_{k,t}$ and thereby generates the matrix $B_{k,t}$. For example, the matrix $B_{k,t}$ becomes a matrix with Nt rows and $N_{s,t}$ columns.

The precoding unit 105c generates a virtual channel matrix $H_{eff}$ that is expressed in following formula (24) based on the generated $B_{k,t}$.

[Expression 19]

$$H_{eff} = \begin{pmatrix} B_{k,1}^H \\ B_{k,2}^H \\ \vdots \\ B_{k,T}^H \end{pmatrix} \quad (24)$$

The matrix $H_{eff}$ is a matrix with Nu rows and Nt columns.

The precoding unit 105c generates the precoding matrix $W'_{t,k}$ by using the generated matrix $H_{eff}$. In a case where the precoding unit 105c is based on the ZF reference, for example, the precoding unit 105c generates the precoding matrix $W'_{t,k}$ in following formula (25).

[Expression 20]

$$W'_{t,k} = H_{eff}^H (H_{eff} H_{eff}^H)^{-1} \quad (25)$$

The kind of the precoding may be different or changed with respect to each of the terminal devices 2t. Precoding includes non-linear precoding and so forth such as Tomlinson-Harashima precoding (THP) and vector perturbation (VP) other than precoding based on linear precoding such as the zero-forcing (ZF) and minimum mean square error (MMSE). The base station device 1c and the terminal devices 2, 2a, or 2b may selectively use those kinds of precoding with respect to each of the terminal devices 2t or may use only one kind for all the terminal devices 21 to 2T.

In the above configuration, the signal sk of the subcarrier k among signals that are transmitted from the base station device 1c is expressed by following formula (17). Here, dk is a column vector that has $N_u$ ($=\Sigma_{t=1}^T N_{s,t}$) elements. Here, $\Sigma_{t=1}^T N_{s,t}$ represents the sum of $N_{s,t}$ from t=1 to T, that is, $N_{s,1} + N_{s,2} + \ldots + N_{s,T}$.

In the MU-MIMO, the plural terminal devices 2t notify the base station device 1c of the feedback information. Thus, in a case where each of the terminal devices 2t notifies the base station device 1c of the radio signal that includes the feedback information, the radio signal is preferably orthogonal to the radio resource such as time, frequency, code, or space. The base station device 1c may schedule use of the radio resource about sending of the radio signal that includes the feedback information of each of the terminal devices 2t.

As described above, in this embodiment, in the communication system, the terminal device 2t may perform appropriate feedback to the base station device 1c also in the MU-MIMO.

In each of the above embodiments, the decomposition processing unit 2121 and the decomposition information replacement unit 2122 perform an equivalent process to the singular value decomposition that is expressed in following formula (26).

[Expression 21]

$$H_k = U_k \cdot \Sigma_k \cdot V_k^H \quad (26)$$
$$= U_k \cdot E_k \cdot E_k \cdot \Sigma_k \cdot E_k \cdot E_k \cdot V_k^H$$
$$= (U_k \cdot E_k) \cdot (E_k \cdot \Sigma_k \cdot E_k) \cdot (V_k \cdot E_k)^H$$
$$= (U_k \cdot E_k) \cdot \Sigma'_k \cdot V'^H_k$$

where, with respect to certain k1 and certain k2 (≠k1), $E_{k1} \neq E_{k2}$ (k1≠k2)

Here, different values of $E_k$ are present between at least two k (for example, k1 and k2) ($E_{k1} \neq E_{k2}$). That is, $E_{k3} = E_{k4}$ may hold for certain k3 and k4, for example. The base station device 1, 1a, 1b, or 1c or the terminal device 2, 2a, or 2b performs the MIMO transmission in which $U_k E_k$ is employed as the left singular matrix, $E_k$ is employed as the singular value matrix, and $V'_k$ ($=V_k E_k$) is employed as the right singular vector by the singular value decomposition that is expressed in formula (26).

The present invention is not limited to this. The permutation matrix may be a unitary matrix. For example, the decomposition processing unit 2121 and the decomposition information replacement unit 2122 may perform an equivalent process to the singular value decomposition that is expressed in following formula (27).

[Expression 22]

$$H_k = U_k \cdot \Sigma_k \cdot V_k^H \quad (27)$$
$$= U_k \cdot U_{1,k}^H \cdot U_{1,k} \cdot \Sigma_k \cdot U_{1,k}^H \cdot U_{1,k} \cdot V_k^H$$
$$= (U_k \cdot U_{1,k}^H) \cdot (U_{1,k} \cdot \Sigma_k \cdot U_{1,k}^H) \cdot (V_k \cdot U_{1,k})^H$$
$$= (U_k \cdot U_{1,k}^H) \cdot \Sigma'_k \cdot V'^H_k$$

where, with respect to certain k1 and certain k2 (≠k1), $U_{1,k1} \neq U_{1,k2}$ (k1≠k2)

Here, different values of $U_{1,k}$ are present between at least two k (for example, k1 and k2) ($U_{1,k1} \neq U_{1,k2}$). That is, $U_{k3} = U_{k4}$ may hold for certain k3 and k4, for example. The base station device 1, 1a, 1b, or 1c or the terminal device 2, 2a, or 2b performs the MIMO transmission in which $U_k U_{1,k}$ is employed as the left singular matrix, $\Sigma_k$ is employed as the singular value matrix, and $V'k$ ($=V_k U_k$) is employed as the right singular vector by the singular value decomposition that is expressed in formula (27).

As described above, the base station device 1, 1a, 1b, or 1c or the terminal device 2, 2a, or 2b causes a unitary matrix $U_{1,k}$ that is different for at least two values of k to work in the singular value decomposition. Alternatively, the base station device 1, 1a, 1b, or 1c or the terminal device 2, 2a, or 2b performs the singular value decomposition that is different for at least two values of k and is equivalent to causing the unitary matrix $U_{1,k}$ which is different for at least two values of k to work. Accordingly, the communication system may flexibly change the feedback information for each k, and the terminal device 2, 2a, or 2b may perform appropriate feedback to the base station device 1, 1a, 1b, or 1c.

In each of the above embodiments, the base station device 1, 1a, 1b, or 1c or the terminal device 2, 2a, or 2b may switch between performing the order replacement process and not performing. For example, the terminal device 2, 2a, or 2b may switch between performing the order replacement process and not performing based on the information notified from the base station device 1, 1a, 1b, or 1c. Further, the base station device 1, 1a, 1b, or 1c or the terminal device 2, 2a, or 2b may switch between performing the order replacement process and not performing based on the reception quality, the number of connection with the terminal device 2, 2a, or 2b, the calculation results of the singular value $\lambda_{k,i}$, or the capability information of the terminal device 2, 2a, or 2b. Further, the base station device 1, 1a, 1b, or 1c or the terminal device 2, 2a, or 2b may switch between performing the order replacement process and not performing based on Nt, Nr, the number of data streams (the number of codewords) Ns, or the number of layers L. Further, the base station device 1, 1a, 1b, or 1c or the terminal device 2, 2a, or 2b may switch between performing the order replacement process and not performing based on presence or absence of the carrier aggregation, the number of cells that are used for the carrier aggregation (the number of component carriers), and the frequency bands. Further, the base station device 1, 1a, 1b, or 1c or the terminal device 2, 2a, or 2b may switch between performing the order replacement process and not performing in accordance with kinds of channels that are used for notification, for example, either one of the control channel or the shared channel. As one example, the base station device 1, 1a, 1b, or 1c or the terminal device 2, 2a, or 2b may perform the order replacement process in a case where the notification is performed by the control channel. On the other hand, the order replacement process may not be performed in a case where the notification is performed by the shared channel. Alternatively, the opposite is possible.

Further, in each of the above embodiments, either one of the base station device 1, 1a, 1b, or 1c and the terminal device 2, 2a, or 2b may notify the other of the information that indicates whether or not the order replacement process is performed. Further, either one of the base station device 1, 1a, 1b, or 1c and the terminal device 2, 2a, or 2b may notify the other of the information that indicates whether or not performing the order replacement process is possible.

Further, in each of the above embodiments, the number of data streams may be the number of codewords, the number of transmission streams, the number of MIMO streams, the number of layers, the number of transmit antennas, or the number of receive antennas or may be the same as the numbers thereof. Further, the number of layers may be the number of data streams, the number of codewords, the number of transmission streams, the number of MIMO streams, the number of transmit antennas, or the number of receive antennas or may be the same as the numbers thereof.

The embodiments of the present invention have been described with reference to the drawings in the foregoing. However, a specific configuration is not limited to the embodiments, and a design or the like which does not depart from the gist of the present invention is also included in the scope of the claims.

It should be noted that the present invention is not limited to the above-described embodiments. The terminal devices and the base station devices of the present invention are not limited to application to terminal devices such as cellular systems. However, it is matter of course that the terminal devices and the base station devices of the present invention may also be applied to electronic apparatuses of stationary types or non-portable types for indoor or outdoor installation, for example, audio-visual apparatuses, kitchen apparatuses, cleaning or washing apparatuses, air conditioners, office apparatuses, vending machines, other household apparatuses, and so forth.

A program that operates in the base station devices and the terminal devices that relate to the present invention is a program that controls a CPU or the like so that functions of the above embodiments related to the present invention are realized (a program that allows a computer to function). In addition, information that is dealt with by such devices is temporarily accumulated in a RAM during a process of the information, thereafter stored in various kinds of ROMs or HDDs. The information is read out, corrected, and written by the CPU as necessary. Recording media to store the program may be any of semiconductor media (for example, ROM, non-volatile memory card, and so forth), optical recording media (for example, DVD, MO, MD, CD, BD, and so forth), magnetic recording media (for example, magnetic tape, flexible disk, and so forth), and so forth. Further, there may be a case where functions of the above-described embodiments are realized by executing the loaded program or functions of the present invention are realized by cooperative processing with an operating system, other application programs, or the like based on instruction of the program.

Further, in a case where the program is distributed in market, the program may be distributed by storing the program in portable recording media and may be transferred to server computers that are connected via a network such as the Internet. In such a case, memory devices of the server computers are included in the present invention. Further, a portion or the whole of the base station devices and the terminal devices in the above-described embodiments may typically be realized as an LSI that is an integrated circuit. Function blocks of the base station devices and the terminal devices may individually be formed into processors, or a portion or all of those may be integrated into a processor.

Further, a method of forming the integrated circuit is not limited to an LSI, but the integrated circuit may be realized as a dedicated circuit or a general purpose processor. Further, in a case where a technology of forming an integrated circuit that replaces the LSI emerges as a result of progress of a semiconductor technology, an integrated circuit by the technology may be used.

INDUSTRIAL APPLICABILITY

Several aspects of the present invention are preferably used for a base station device, a terminal device, and a feedback information generation method.

REFERENCE SIGNS LIST 1, 1a, 1b, 1c base station device
101, 101-1 to 101-Ns channel coding unit
102, 102-1 to 102-Ns data modulation unit
103 reference signal generation unit
104 layer mapping unit
105, 105a, 105b, 105c precoding unit
106-1 to 106-Nt mapping unit
107-1 to 107-Nt transmission processing unit
A1-1 to A1-Nt antenna
111 radio reception unit
112, 112a, 112b, 112c feedback information acquisition unit
2, 2a, 2b, 21 to 2T terminal device
A2-1 to A2-Nr, A2t-1 to A2t-Nr,t antenna
201-1 to 201-Nr reception processing unit
202-1 to 202-Nr de-mapping unit
203, 203b filter unit
204 layer de-mapping unit
205, 205-1 to 205-Ns data demodulation unit
206, 206-1 to 206-Ns channel decoding unit
211 channel estimation unit
212 feedback information generation unit
213 radio transmission unit
2121 decomposition processing unit
2122 decomposition information replacement unit
2123 conversion processing unit

The invention claimed is:

1. A terminal device that is configured to perform MIMO transmission with a base station device, the terminal device comprising:
    channel estimation circuitry configured to estimate channel state information between the terminal device and the base station device;
    decomposition processing circuitry configured to perform a decomposition process for the channel state information to acquire first decomposition information which includes plural singular values and second decomposition information which includes plural right singular vectors which are respectively associated with the plural singular values;
    decomposition information replacement circuitry configured to mutually replace portions of the plural singular values to acquire first replacement information and further acquires second replacement information based on the first replacement information and the plural right singular vectors;
    radio transmission circuitry configured to notify the base station device of information based on the second replacement information; and
    conversion processing circuitry configured to perform a conversion process for the second replacement information to acquire second conversion information;
wherein the radio transmission circuitry is configured to notify the base station device of the second conversion information as the information based on the second replacement information.

2. The terminal device according to claim 1,
    wherein the conversion processing circuitry is further configured to perform the conversion process for the first replacement information to acquire first conversion information, and
    the radio transmission circuitry is further configured to notify the base station device of the first conversion information.

3. The terminal device according to claim 2,
    wherein in a case where a difference between two singular values which are included in the plural singular values is less than a preset threshold value, the decomposition information replacement circuitry is configured to replace at least the two singular values and acquires the first replacement information.

4. The terminal device according to claim 3,
wherein the conversion processing circuitry is further configured to
perform the conversion process for the first decomposition information to acquire third conversion information and performs the conversion process for the second decomposition information to acquire fourth conversion information,
use a pair of the first conversion information and the second conversion information and a pair of the third conversion information and the fourth conversion information to perform comparison of errors, and selects the pair with a less error, and
the radio transmission circuitry is configured to notify the base station device of information that is selected by the conversion processing circuitry as the information based on the second replacement information.

5. The terminal device according to claim 2,
wherein the conversion processing circuitry is further configured to
perform the conversion process for the first decomposition information to acquire third conversion information and performs the conversion process for the second decomposition information to acquire fourth conversion information,
use a pair of the first conversion information and the second conversion information and a pair of the third conversion information and the fourth conversion information to perform comparison of errors, and selects the pair with a less error, and
the radio transmission circuitry is configured to notify the base station device of information that is selected by the conversion processing circuitry as the information based on the second replacement information.

6. The terminal device according to claim 5,
wherein the conversion processing circuitry is further configured to
perform the conversion process for the first decomposition information to acquire third conversion information and performs the conversion process for the second decomposition information to acquire fourth conversion information,
use a pair of the first conversion information and the second conversion information and a pair of the third conversion information and the fourth conversion information to perform comparison of errors, and selects the pair with a less error, and
the radio transmission circuitry is configured to notify the base station device of information that is selected by the conversion processing circuitry as the information based on the second replacement information.

7. The terminal device according to claim 1,
wherein in a case where a difference between two singular values which are included in the plural singular values is less than a preset threshold value, the decomposition information replacement circuitry is configured to replace at least the two singular values and acquires the first replacement information.

8. The terminal device according to claim 7,
wherein the conversion processing circuitry is further configured to
perform the conversion process for the first decomposition information to acquire third conversion information and performs the conversion process for the second decomposition information to acquire fourth conversion information,
use a pair of the first conversion information and the second conversion information and a pair of the third conversion information and the fourth conversion information to perform comparison of errors, and selects the pair with a less error, and
the radio transmission circuitry is configured to notify the base station device of information that is selected by the conversion processing circuitry as the information based on the second replacement information.

9. A feedback information generation method in a terminal device that is configured to perform MIMO transmission with a base station device, the feedback information generation method comprising:
estimating channel state information between the terminal device and the base station device;
acquiring first decomposition information which includes plural singular values by performing decomposition process for the channel state information;
acquiring second decomposition information which includes plural right singular vectors which are respectively associated with the plural singular values;
acquiring first replacement information by mutually replacing portions of the plural singular values;
acquiring second replacement information based on the first replacement information and the plural right singular vectors; and
performing a conversion process for the second replacement information.

* * * * *